(12) United States Patent
Urakawa

(10) Patent No.: US 8,824,260 B2
(45) Date of Patent: Sep. 2, 2014

(54) POSITION CONTROL APPARATUS AND POSITION CONTROL METHOD

(71) Applicant: Sony Corporation, Tokyo (JP)

(72) Inventor: Yoshiyuki Urakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/063,365

(22) Filed: Oct. 25, 2013

(65) Prior Publication Data

US 2014/0119165 A1    May 1, 2014

(30) Foreign Application Priority Data

Nov. 1, 2012   (JP) ................................. 2012-242140

(51) Int. Cl.
*G11B 7/00*  (2006.01)
*G11B 7/09*  (2006.01)

(52) U.S. Cl.
CPC ........................................ *G11B 7/094* (2013.01)
USPC .................. 369/53.28; 369/44.29; 369/53.23; 369/44.35

(58) Field of Classification Search
None
See application file for complete search history.

(56) References Cited

U.S. PATENT DOCUMENTS

| | | | | |
|---|---|---|---|---|
| 2012/0092976 A1* | 4/2012 | Urakawa | | 369/44.14 |
| 2012/0113775 A1* | 5/2012 | Horigome | | 369/44.14 |
| 2012/0113777 A1* | 5/2012 | Horigome | | 369/44.26 |
| 2013/0010580 A1* | 1/2013 | Mukasa et al. | | 369/44.14 |
| 2013/0223198 A1* | 8/2013 | Ando et al. | | 369/44.11 |
| 2013/0258828 A1* | 10/2013 | Nagatomo et al. | | 369/47.14 |
| 2013/0258829 A1* | 10/2013 | Nakamuro et al. | | 369/47.14 |

FOREIGN PATENT DOCUMENTS

JP    2012-089198 A    5/2012

* cited by examiner

*Primary Examiner* — Brenda Bernardi
(74) *Attorney, Agent, or Firm* — Wolf, Greenfield & Sacks, P.C.

(57) ABSTRACT

There is provided a position control apparatus including a light radiating/receiving unit that performs radiation of laser light for recording and laser light for adjacent track servo onto an optical disc recording medium through a common objective lens, and receives return light of the laser light for the adjacent track servo and the laser light for the reference surface, a tracking mechanism unit that displaces the objective lens, a reference surface tracking error signal generating unit that generates a reference surface tracking error signal, a reference surface tracking servo control unit that controls the tracking mechanism unit, a recording layer tracking error signal generating unit that generates a recording layer tracking error signal, an integrating unit that integrates the recording layer tracking error signal, an offset providing unit that provides an integration output by the integrating unit, and a feedforward control unit that generates a control signal.

5 Claims, 30 Drawing Sheets

CLOSED-LOOP CHARACTERISTIC OF ATS LOOP

CLOSED-LOOP CHARACTERISTIC OF ATS LOOP

CONTROL TARGET FREQUENCY CHARACTERISTIC

POSITION CONTROL APPARATUS AND POSITION CONTROL METHOD

CROSS REFERENCE TO RELATED APPLICATIONS

This application claims the benefit of Japanese Priority Patent Application JP 2012-242140 filed Nov. 1, 2012, the entire contents of which are incorporated herein by reference.

BACKGROUND

The present disclosure relates to a position control apparatus and a position control method that control a spot position of laser light radiated to an optical disc recording medium.

As optical recording media in which a signal is recorded or reproduced by radiation of light, so-called optical disc recording media (hereinafter, simply referred to as optical discs) such as a compact disc (CD), a digital versatile disc (DVD), and a Blu-ray disc (BD: registered trademark) have spread widely.

In addition, recording/reproducing apparatuses that perform recording/reproducing with respect to the optical discs have spread widely.

In a recording/reproducing apparatus with respect to the optical discs, tracking servo is applied to record information by a constant track pitch.

In general, in a recordable-type optical disc, a guide groove (for example, a wobbling groove) is formed with respect to a recording surface and information is recorded by a constant track pitch by applying the tracking servo to follow the guide groove.

Meanwhile, in recent years, an optical disc in which a guide groove is not formed with respect to a recording surface has been suggested. As a tracking servo method, so-called adjacent track servo (ATS) disclosed in Japanese Patent Application Laid-Open (JP-A) No. 2012-89198 has been suggested.

In the ATS, a beam spot Swr for recording to perform recording with respect to the recording surface and a spot Sats for adjacent track servo are formed. The beam spot Swr for the recording and the spot Sats for the adjacent track servo are formed by radiating laser light to form each spot S through a common objective lens. Under this situation, the tracking servo with respect to the objective lens is performed such that the spot Sats for the adjacent track servo follows a track before one lap where the beam spot Swr for the recording is formed. Thereby, information recording by a constant pitch is realized.

SUMMARY

Position control technology based on the ATS is expected as superior technology in realizing the information recording by the constant pitch. However, there are many problems to be resolved. In particular, as pointed out in Japanese Patent Application Laid-Open (JP-A) No. 2012-89198, it is necessary to improve stability of an operation.

It is desirable to enable an operation of a control system to be stabilized, when a position control method based on adjacent track servo (ATS) is adopted.

According to an embodiment of the present disclosure, there is provided a position control apparatus including a light radiating/receiving unit that performs radiation of laser light for recording and laser light for adjacent track servo targeted at a recording layer and radiation of laser light for a reference surface targeted at the reference surface, onto an optical disc recording medium including the reference surface to which a position guider is provided and the recording layer where information recording is performed, through a common objective lens, and receives return light of the laser light for the adjacent track servo and the laser light for the reference surface, a tracking mechanism unit that displaces the objective lens in a tracking direction, a reference surface tracking error signal generating unit that generates a reference surface tracking error signal showing tracking error of a radiation spot of the laser light for the reference surface with respect to the position guider, on the basis of a light reception signal with respect to the return light of the laser light for the reference surface obtained by the light radiating/receiving unit, a reference surface tracking servo control unit that controls the tracking mechanism unit, on the basis of a tracking servo signal generated on the basis of the reference surface tracking error signal, a recording layer tracking error signal generating unit that generates a recording layer tracking error signal showing tracking error of a radiation spot of the laser light for the adjacent track servo with respect to a recording track, on the basis of a light reception signal with respect to the return light of the laser light for the adjacent track servo obtained by the light radiating/receiving unit, an integrating unit that integrates the recording layer tracking error signal, an offset providing unit that provides an integration output by the integrating unit as an offset with respect to a control target value by the tracking servo control unit, and a feedforward control unit that generates a control signal based on the integration output by the integrating unit and provides the control signal with respect to the tracking servo signal by the reference surface tracking servo control unit.

As such, in the present disclosure, a configuration (tracking servo control system based on ATS+ to be described below) where the integration output of the recording layer tracking error signal is provided to the control target value of the tracking servo loop based on the reference surface tracking error signal is adopted. In this configuration, the feedforward control to generate the control signal based on the integration output by the integrator and provide the control signal with respect to the tracking servo signal by the reference surface tracking servo control unit is performed.

By the feedforward control, a transfer function of a reference surface loop based on the reference surface tracking error signal can be adjusted without affecting vibration and shock resistance. By adjusting the transfer function of the reference surface loop, it becomes possible to set a characteristic where generation of an oscillation is prevented with respect to an entire control system. Therefore, an operation of the control system can be stabilized.

According to the embodiments of the present disclosure described above, when a position control method based on adjacent track servo (ATS) is adopted, generation of an oscillation of a control system can be prevented and an operation of the control system can be stabilized.

DETAILED DESCRIPTION OF THE EMBODIMENT(S)

Figure 1:
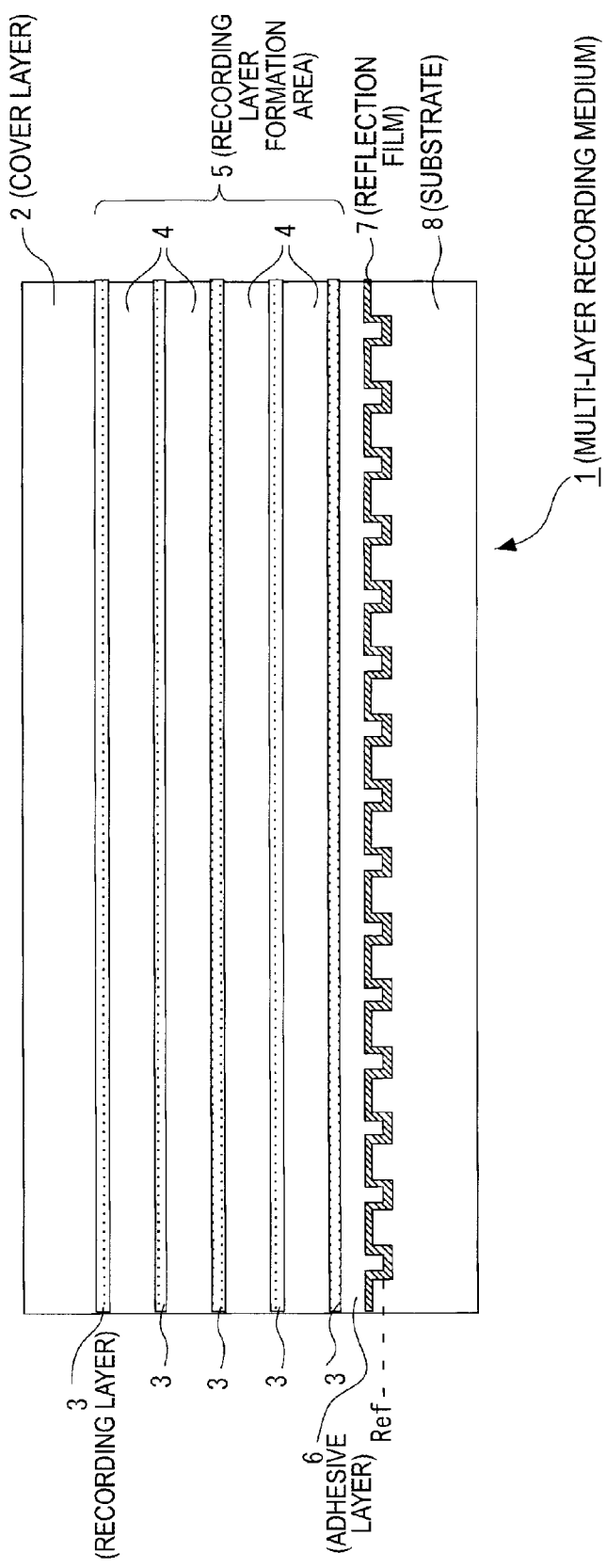
FIG. 1 is a diagram illustrating a cross-sectional structure of a recording medium used in an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.
<1. Recording Medium used in Embodiment>
<2. Position Control Method according to Related Art>
[2-1. Initially Suggested Position Control Method]
[2-2. Problem of Initial Method]
[2-3. ATS]
[2-4. ATS+]
<3. Entire Configuration of Position Control Apparatus when ATS+ is adopted]
<4. Detail and Problem of ATS+]
<5. Position Control Method according to Embodiment>
[5-1. Feedforward Control]
[5-2. Example of Specific Characteristic Derivation Method]
<6. Modification>
<1. Recording Medium Used in Embodiment>

FIG. 1 illustrates a cross-sectional structure of a multi-layer recording medium 1 corresponding to a recording medium that is used in an embodiment.

First, it is assumed that the multi-layer recording medium 1 used in the embodiment is a disc-shaped optical recording medium (hereinafter, simply referred to as an optical disc). Here, the optical recording medium collectively means a recording medium in which information is recorded or reproduced by radiation of light.

As illustrated in FIG. 1, the multi-layer recording medium 1 includes a cover layer 2, a recording layer formation region 5 having a plurality of recording layers 3 formed therein, an adhesive layer 6, a reflection film 7, and a substrate 8, which are sequentially formed from an upper layer side.

In the present disclosure, the "upper layer side" indicates an upper layer side when a surface on which laser light from the side of a recording apparatus (a recording/reproducing apparatus 10) described below is incident is defined as a top surface.

In the multi-layer recording medium 1, the cover layer 2 is formed of a resin and functions as a protection layer of the recording layer formation region 5 formed on a lower layer side thereof.

The recording layer formation region 5 has the plurality of recording layers 3 and intermediate layers 4 inserted between the recording layers 3, as illustrated in FIG. 1. That is, the recording layer formation region 5 is formed by repetitive stacking of the recording layer 3→the intermediate layer 4→the recording layer 3→the intermediate layer 4 . . . →the recording layer 3.

The recording layer 3 is formed of a translucent recording film. The intermediate layer 4 is formed of a resin material such as a thermoplastic resin or an ultraviolet curable resin.

In FIG. 1, the five recording layers 3 are formed in the recording layer formation region 5 to simplify the drawing. However, the number of recording layers is only exemplary and may be a number other than "5".

In the recording layer formation region 5, a position guider associated with formation of grooves or pit strings is not formed in each recording layer 3 as apparent from the drawing. That is, each recording layer 3 may be described to be formed in a planar shape.

When the recording layer formation region 5 is formed, a formation process of the position guider for each recording layer that is necessary to manufacture the present multi-layer disc can be removed. As a result, a manufacturing cost and a mass production cost of the multi-layer recording medium 1 can be efficiently decreased.

On the lower layer side of the recording layer formation region 5, the reflection film 7 is formed with the adhesive layer (intermediate layer 6) formed of a necessary adhesive material therebetween.

In the reflection film 7, a position guider to guide a recording/reproducing position is formed. The formation of the position guider on the reflection film means that the reflection film is formed on an interface on which the position guider is formed.

Specifically, in this case, the position guider is formed with respect to one surface of the substrate 8 in FIG. 1, so that an uneven cross-sectional shape is formed. The reflection film 7 is formed on the surface of the substrate 8 having the uneven cross-sectional shape, so that the position guider is formed on the reflection film 7.

The substrate 8 is formed of a resin such as polycarbonate. The substrate 8 can be formed by injection molding using a stamper to form the uneven cross-sectional shape functioning as the position guider.

In this case, in the present recordable optical disc, address information (absolute position information: radius position information and rotation angle information) showing an absolute position in a direction parallel to an in-plane direction of a recording surface of the multi-layer recording medium 1 can be recorded by the formation of the position guider. For example, the absolute position information can be recorded by a change of a meandering (wobble) period of the grooves, when the position guider is formed of the grooves, and can be recorded by a change of lengths or a formation interval of the pits, when the position guider is formed of the pit strings.

As will be described below, in this example, the position guider is formed of the pit strings.

As described above, the position guider is not formed with respect to the recording layer 3. Control of a recording position on the recording layer 3 is performed on the basis of reflection light from the reflection film 7 provided with the position guider as will be described below.

In this sense, the reflection film 7 (reflection surface) provided with the position guider is represented as a "reference surface Ref".

<2. Position Control Method According to Related Art>
[2-1. Initially Suggested Position Control Method]

Figure 2:
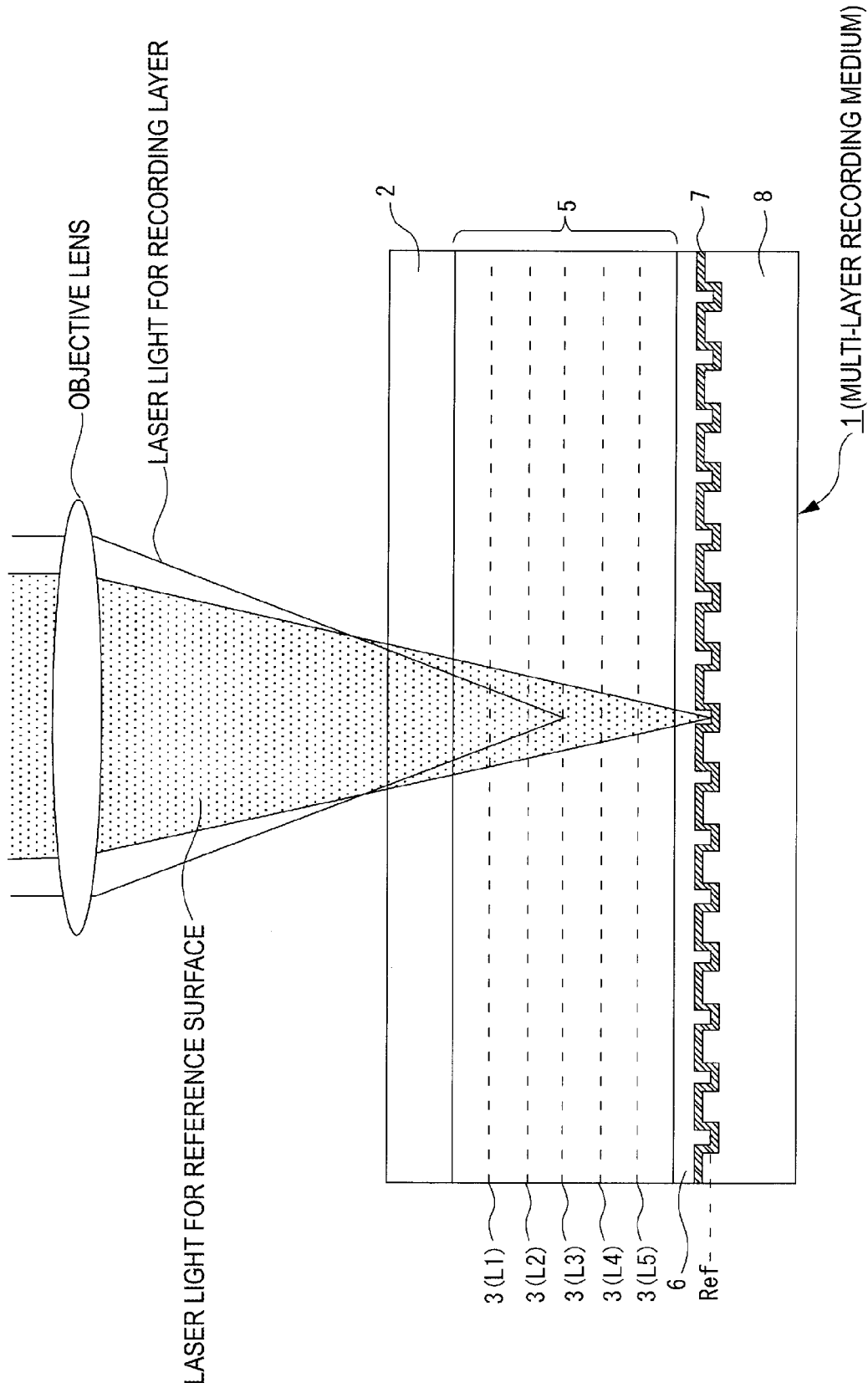
FIG. 2 is a diagram illustrating an initial position control method.

FIG. 2 is a diagram illustrating a position control method using the position guider formed on the reference surface Ref, which is suggested at the initial stage of development of the multi-layer recording medium 1.

In FIG. 2, the five recording layers 3 that are formed in this case are shown by L1, L2, L3, L4, and L5 sequentially from the upper layer side.

First, in the initial method, laser light for a recording layer to be radiated to the recording layer 3 and laser light for a reference surface to perform position control based on the position guider in the reference surface Ref are radiated to the multi-layer recording medium 1.

Specifically, the laser light for the recording layer and the laser light for the reference surface are radiated to the multi-layer recording medium 1 through a common objective lens as illustrated in FIG. 2.

When mark recording is performed with respect to the certain recording layer 3 (hereinafter, referred to as a recording layer Ln) to be targeted, the laser light for the reference surface is radiated to be focused on the reflection surface (reference surface Ref) of the reflection film 7, so that the position control of the objective lens is performed according to a tracking error signal obtained on the basis of the reflection light (that is, tracking servo is applied).

Thereby, a position of the laser light for the recording layer radiated through the same objective lens in a tracking direction can be controlled together.

Meanwhile, position control when reproducing is performed can be realized as follows.

When the reproducing is performed, because mark strings (that is, recording completed tracks) are formed in the recording layer Ln, the tracking servo can be applied to the mark strings by the laser light for the recording layer. That is, the tracking servo at the time of the reproducing can be realized by performing the position control of the objective lens according to the tracking error signal obtained on the basis of the reflection light of the laser light for the recording layer.

When the initial position control method is adopted, if light having the same wavelength band as the laser light for the recording layer is used as the laser light for the reference surface, it becomes necessary to increase reflectance of the reference surface Ref from which reflection light of the laser light for the reference surface is obtained. However, as such, if the reflectance of the reference surface Ref increases, a stray light component with respect to the laser light for the recording layer increases according to the increase in the reflectance and reproducing performance may be greatly deteriorated.

For this reason, light having different wavelength bands are used as the laser light for the reference surface and the laser light for the recording layer and a reflection film having wavelength selectivity is used as the reflection film 7 to form the reference surface Ref.

As a specific example, a wavelength of the laser light for the recording layer is set to about 405 nm, similar to the case of a Blu-ray disc (BD), and a wavelength of the laser light for the reference surface is set to about 650 nm, similar to the case of a digital versatile disc (DVD). In addition, a reflection film having wavelength selectivity that selectively reflects light having the same wavelength band as the laser light for the reference surface and transmits or absorbs light having the other wavelengths is used as the reflection film 7. By this configuration, an unnecessary reflection light component of the laser light for the recording layer can be prevented from being generated from the reference surface Ref and a superior signal/noise (S/N) ratio can be secured.

Meanwhile, in the multi-layer recording medium 1 in which the position guider such as the grooves is not formed in the recording layer 3, seek with respect to a recording start position when recording is performed is performed using address information recorded on the reference surface Ref.

Specifically, when recording is performed with respect to the recording layer Ln to be targeted, a recording start address on the reference surface Ref is specified on the basis of a write command and the seek is first performed with respect to the recording start address on the reference surface Ref, using the laser light for the reference surface. In addition, recording using the laser light for the recording starts according to the completion of the seek. Thereby, recording of data can start from a position corresponding to the recording start address on the recording layer Ln can be started.

With respect to reproducing of the information recorded on the recording layer Ln to be targeted, seek using an address on the reference surface Ref is first performed. Specifically, a reproducing start address on the reference surface Ref specified on the basis of a read command is set as a target and a seek operation using the laser light for the reference surface is performed.

After the seek based on the address of the reference surface Ref is performed, tracking servo control with respect to the objective lens is switched from servo control based on the reflection light of the laser light for the reference surface to servo control based on the reflection light of the laser light for the recording layer. Thereby, a beam spot of the laser light for the recording layer can be made to follow a track near the reproducing start position on the recording layer Ln.

Then, the position can be moved to a predetermined reproducing start position by reading address information recorded on the recording layer Ln and data reproducing from the reproducing start position can start.

[2.2. Problem of Initial Method]

According to the initial method described above, with respect to the multi-layer recording medium 1 in which the position guider is not performed in the recording layer 3, information can be recorded at a predetermined position on the recording layer Ln. However, when recording is performed with respect to the multi-layer recording medium 1, it is necessary to consider generation of a deviation of an information recording position due to a deviation of a spot position between the laser light for the recording layer and the laser light for the reference surface to be described below, in actuality.

Specifically, when the initial method is adopted, the deviation of the information recording position in the tracking direction is generated by a lens shift of the objective lens generated due to the eccentricity of the multi-layer recording medium 1 or the backlash of a slide mechanism of an optical pickup.

Here, the lens shift generated due to the backlash of the slide mechanism means that the optical pickup is rapidly (instantaneously) displaced due to generation of the mechanistic backlash in the slide mechanism during the slide servo control and the position of the objective lens during the tracking servo control is shifted to absorb the displacement.

Figure 3:
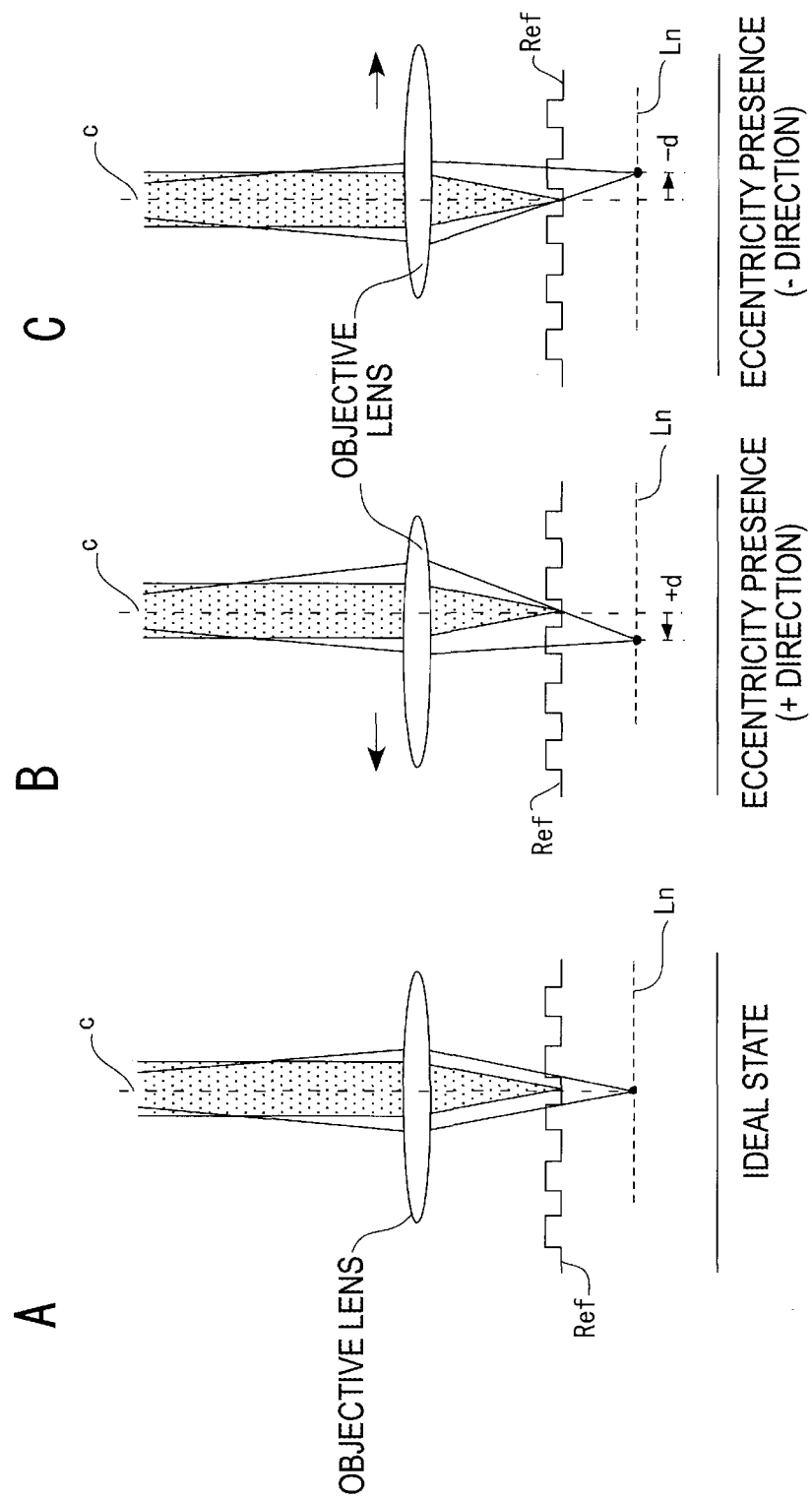
FIG. 3 is a diagram illustrating the principle of a deviation of an information recording position being generated by a lens shift of an objective lens.

FIG. 3 is a diagram illustrating the principle of the deviation of the information recording position being generated by the lens shift of the objective lens.

In FIG. 3, FIG. 3A illustrates an ideal state in which the eccentricity of the multi-layer recording medium 1 or the backlash of the slide mechanism is not generated and the lens shift of the objective lens is not generated, FIG. 3B illustrates the case in which a lens shift (referred to as eccentricity of a + direction) of a leftward direction of a plane of paper (for example, an outer circumferential direction) is generated, and FIG. 3C illustrates the case in which a lens shift (referred to as eccentricity of a − direction) of a rightward direction of the plane of paper (for example, an inner circumferential direction) is generated.

In FIG. 3, in order to simplify the drawing, the case in which the reference surface Ref is formed on the upper layer side of the recording layer formation region 5 provided with the plurality of recording layers 3 is illustrated. However, the deviation of the information recording position is generated with the same principle, even when the reference surface Ref is formed on the lower layer side of the recording layer formation region 5, similar to the case of FIG. 2.

First, a center axis c is a center axis that is set in designing an optical system. In the ideal state illustrated in FIG. 3A, the center of the objective lens is aligned with the center axis c (this is represented as a lens center position).

Meanwhile, when the lens shift of the + direction illustrated in FIG. 3B is generated, the center of the objective lens is shifted in the + direction with respect to the center axis c of the optical system.

At this time, because the laser light (patterned laser beam) for the reference surface is incident on the objective lens by parallel light, a position change of the focus position in a tracking direction is not generated, even when the shift is generated from the center axis c of the objective lens.

Meanwhile, because the laser light (outlined laser beam) for the recording layer is incident on the objective lens by non-parallel light to be focused on the recording layer 3 formed at a depth position different from the reference surface Ref, the focus position (information recording position) of the laser light for the recording layer may change in the + direction by an amount according to a lens shift amount (deviation amount +d in FIG. 3B), when the shift of the objective lens in the + direction is generated.

When the lens shift of the − direction illustrated in FIG. 3C is generated, the information recording position based on the laser light for the recording layer changes in the − direction by the amount according to the lens shift amount (deviation amount −d in FIG. 3C).

As such, in the method described above with reference to FIG. 2, that is, the method is applied so that the laser light for the recording layer and the laser light for the reference surface are radiated through the common objective lens, the focus position of the laser light for the recording layer and the focus position of the laser light for the reference surface are different from each other, and the tracking servo control of the objective lens is performed such that the focus position of the laser light for the reference surface follows the position guider formed in the reference surface Ref, the information recording position based on the laser light for the recording layer may deviate in the tracking direction, due to the eccentricity of the disc or the backlash of the slide mechanism.

At this time, depending on the magnitude of the eccentricity or setting of the track pitch (formation interval of guide grooves), information recording positions may overlap between adjacent guide grooves. In this case, a recording signal may not be correctly reproduced.

The lens shift of the objective lens has been described as a main factor of the deviation of the information recording position. However, the deviation of the information recording position is also caused by a disc tilt.

As one measure to resolve the problem of the deviation of the information recording position described above, a method of increasing the track pitch to become more than the change amount of the information recording position may be exemplified.

However, this method may cause the recording capacity to decrease due to the increase in the track pitch.

As another method, a method of configuring a system in which a disc may not be attached/detached may be exemplified.

In this case, as a factor of the eccentricity, an error of a disc inner diameter and a clamp diameter with respect to a spindle motor is exemplified. In terms of processing, because it is not possible to make the error of the disc inner diameter and the clamp diameter become zero, the eccentricity is generated. Therefore, if the system in which the disc may not be attached/detached is configured, overlapping of the recording positions can be avoided, because an influence by the eccentricity is equalized. Thereby, the track pitch can be decreased and the recording capacity can be increased by the decrease in the track pitch.

However, because the disc may not be exchanged in the above method, only the disc may not be exchanged when a defect of the disc occurs. In addition, data that is recorded by any apparatus may not be read by another apparatus. That is, at this point, convenience is impaired.

[2-3. ATS]

Therefore, as an effective method to avoid the above problem, so-called adjacent track servo (ATS) is suggested. The ATS is originally examined as a self servo track writer (SSTW) in a hard disk drive.

Figure 4:
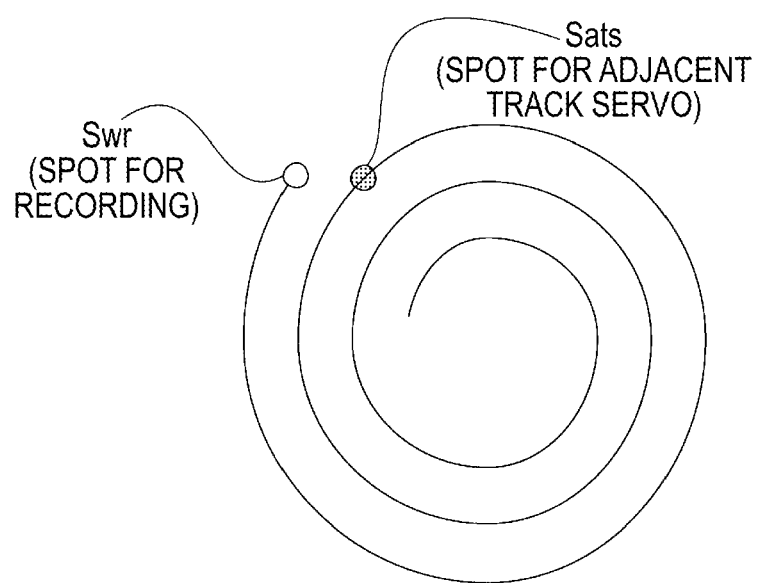
FIG. 4 is a diagram illustrating ATS.

FIG. 4 is a diagram illustrating the ATS.

In the ATS, two laser light are radiated as the laser light for the recording layer to be radiated to the recording layer 3, so that a spot Swr for recording and a spot Sats for adjacent track servo are formed on the recording layer Ln. The spots Swr and Sats are formed by radiating light beams becoming origins thereof to the recording medium through the common objective lens.

In the ATS, the spot Swr for the recording is defined as a preceding spot (that is, the outer circumferential side when an advancement direction of recording is inner circumference→outer circumference) and the spot Sats for the adjacent track servo is defined as a following spot and the tracking servo is applied by the spot Sats for the adjacent track servo, with respect to a mark string formed by the spot Swr for the recording. That is, the tracking servo control of the objective lens is performed such that the spot Sats for the adjacent track servo follows an immediately previous track formed by the spot Swr for the recording.

According to the ATS, because the track pitch can be constant at the distance between the spots S, the tracks can be prevented from being overlapped due to an influence of the eccentricity. That is, it is not necessary to sufficiently increase the track pitch in consideration of the deviation of the information recording position due to the eccentricity or configure the system in which the disc may not be attached/detached, as described above.

[2-4. ATS+]

As such, according to the ATS, because the track pitch of the recording layer 3 can be constantly maintained, recording information can be prevented from not being reproduced due to crossing of the tracks.

Figure 5:
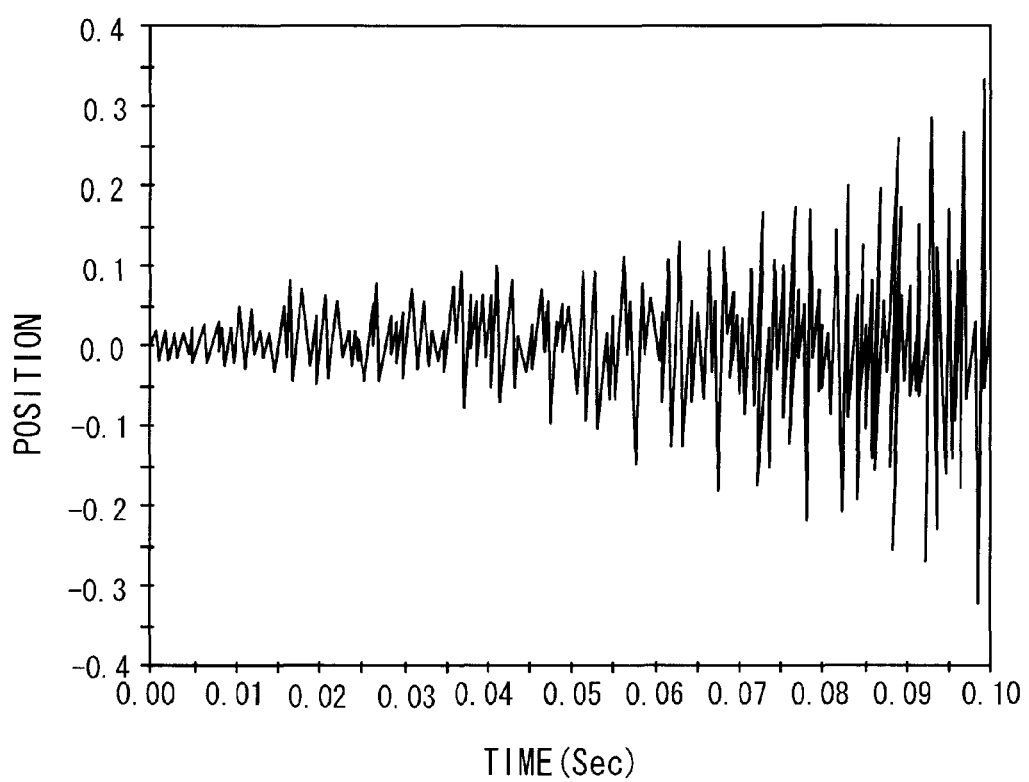
FIG. 5 is a diagram illustrating a problem that occurs when the ATS is adopted.

However, this corresponds to when the ATS ideally functions. In an actual system, a tracking error component increases with a time passage (that is, whenever turning is repeated), as illustrated in FIG. 5, due to a residue of tracking error in a tracking servo system based on the spot Sats for the adjacent track servo. As a result, it may become difficult to stably perform the tracking servo.

Therefore, in this embodiment, a method called an ATS+ (ATS plus) is adopted as the position control method with respect to the laser light for the recording.

Figure 6:
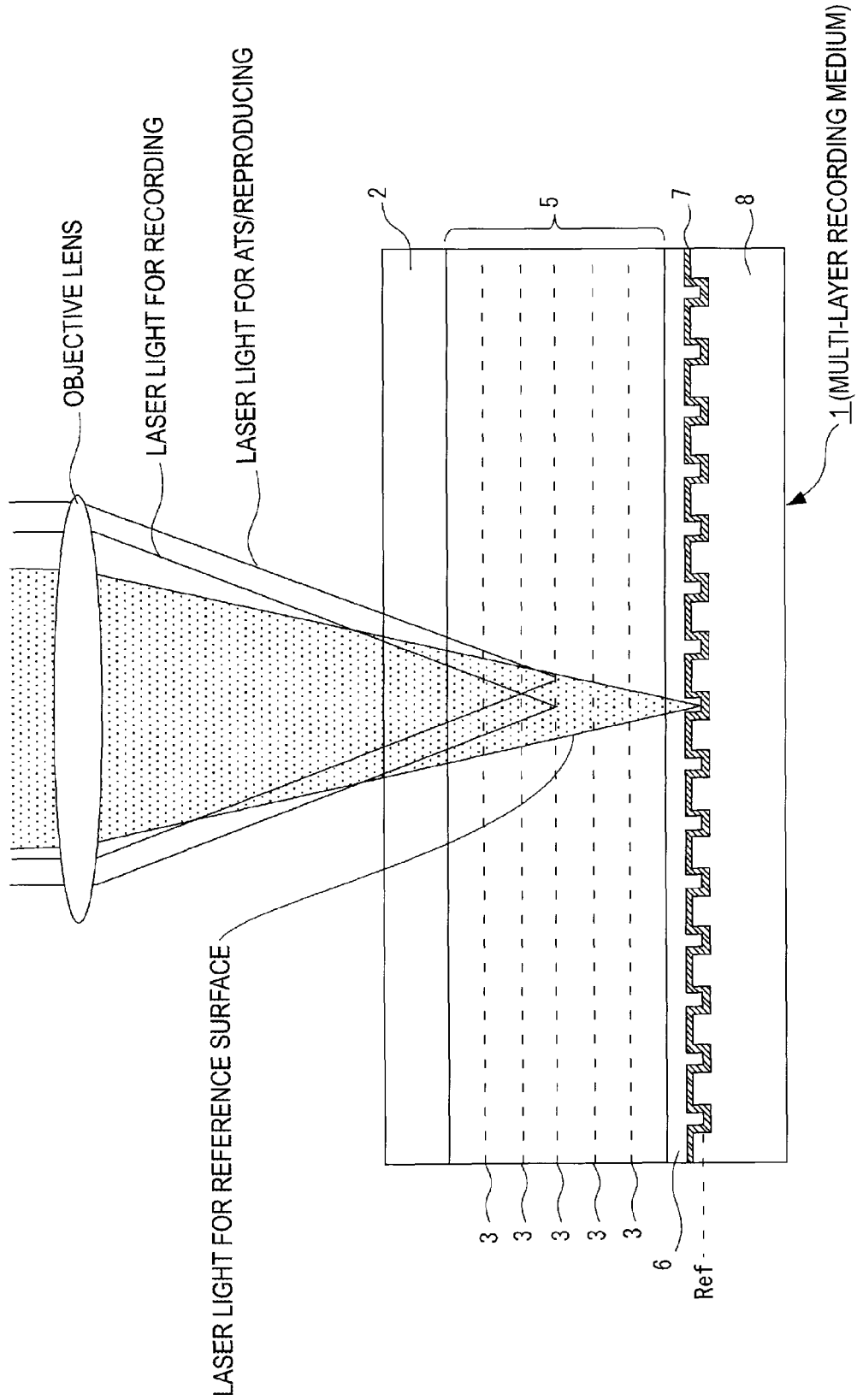
FIG. 6 is a diagram illustrating laser light used by ATS+.

FIG. 6 illustrates each laser light used by the ATS+.

Similar to the ATS, in the ATS+, a laser light for recording to form the spot Swr for the recording and laser light (in FIG. 6, represented as laser light for ATS/reproducing) to form the spot Sats for the adjacent track servo are radiated as the laser light for the recording layer.

In this example, a laser to emit the laser light for the adjacent track servo when recording is performed functions as a laser to emit laser light to reproduce information of the recording layer 3 when reproducing is performed. In this sense, the laser light that is emitted from the laser and is radiated to the multi-layer recording medium 1 is represented as the "laser light for the ATS/reproducing".

In addition, in the ATS+, the laser light for the reference surface as well as the laser light for the adjacent track servo (the laser light for the ATS/reproducing) is used when the tracking servo control with respect to the objective lens is performed.

Figure 7:
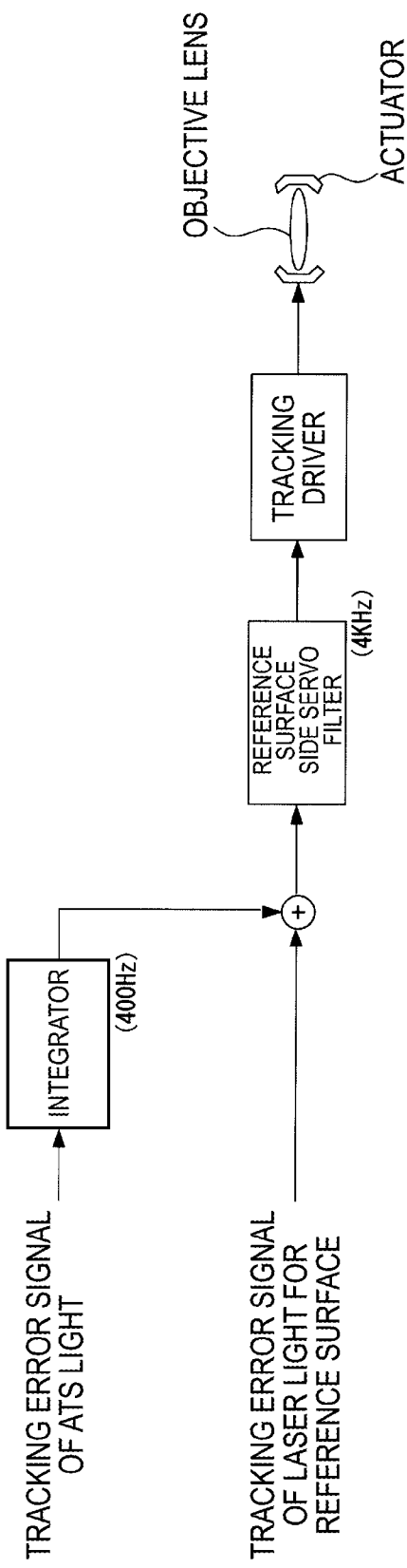
FIG. 7 is a diagram illustrating the concept of the ATS+.

FIG. 7 is a diagram illustrating the concept of the ATS+.

As illustrated in FIG. 7, in the ATS+, first, a reference surface side servo filter (controller) to execute a filter process for the tracking servo control with respect to a tracking error signal of the laser light for the reference surface and a tracking driver to drive an actuator holding the objective lens to be displaceable in the tracking direction, on the basis of an output of the reference surface side servo filter, are provided.

That is, in the ATS+, a tracking servo loop (hereinafter, referred to as a reference surface loop) that performs the tracking servo control of the objective lens on the basis of the tracking error signal of the laser light for the reference surface is formed.

In the ATS+, a control system based on the ATS is formed with a control system as a reference surface loop. Specifically, an integrator to integrate the tracking error signal with respect to the laser light for the ATS/reproducing (in FIG. 7, represented as ATS light) and an adding unit to provide an integration output from the integrator to a tracking servo loop of the reference surface side are provided. This means that an output from the integrator is provided as an offset of a target value (control target value) of the reference surface loop. Alternatively, this means that the tracking servo loop functioning as the reference surface loop is set as a minor loop and an integration output of the tracking error signal of the ATS light is provided as an offset of a control target value of the minor loop.

In the case of the above configuration, tracking error of the ATS control system is generated mainly due to the deviation of the spot position (refer to FIG. 3) generated by the lens shift of the objective lens.

In addition, tracking error information of the ATS side is provided to the control target value of the reference surface loop, so that the objective lens is driven such that the spot Sats of the laser light for the ATS/reproducing follows the track on the recording layer Ln.

As understood from the above description, similar to the case of the ATS, in the ATS+, generation of a situation where the track on the recording layer Ln overlaps or crosses the adjacent track can be prevented.

As understood from the above description, it is necessary to provide a function of following a normal disturbance component in the reference surface loop including the reference surface side servo filter.

In this sense, a control band of the reference surface loop is set to the same control band as the control band when the normal servo control is performed. Specifically, in the case of this example, the control band of the reference surface loop is set to about 4 kHz.

Meanwhile, because it is not necessary to provide the function of following the normal disturbance component with respect to the ATS control system (ATS loop) including the integrator, a control band of the ATS loop is set to a frequency band lower than the control band of the reference surface loop. Specifically, in the case of this example, the control band of the ATS loop is set to about 400 Hz.

As such, according to the ATS+ in which the integration output (control signal of the ATS control system) of the tracking error signal of the ATS light is provided to the tracking servo loop (minor loop) functioning as the reference surface loop, tolerance for an emission state that is generated in the case in which the ATS according to the related art is used and is illustrated in FIG. 5 can be further improved. That is, the tracking servo control that can prevent overlapping or crossing of the recording tracks from being generated can be stabilized as compared with the case in which the ATS according to the related art is used.

The detail of the ATS+ will be described later.

<3. Entire Configuration of Position Control Apparatus in Case in which ATS+ is Adopted>

A specific configuration example of a position control apparatus in the case in which ATS+ is adopted will be described with reference to FIGS. 8 and 9. Here, the position control apparatus that is exemplified below has a recording function and a reproducing function with respect to the multi-layer recording medium 1. In this sense, the position control apparatus is referred to as a recording/reproducing apparatus 10.

Figure 8:
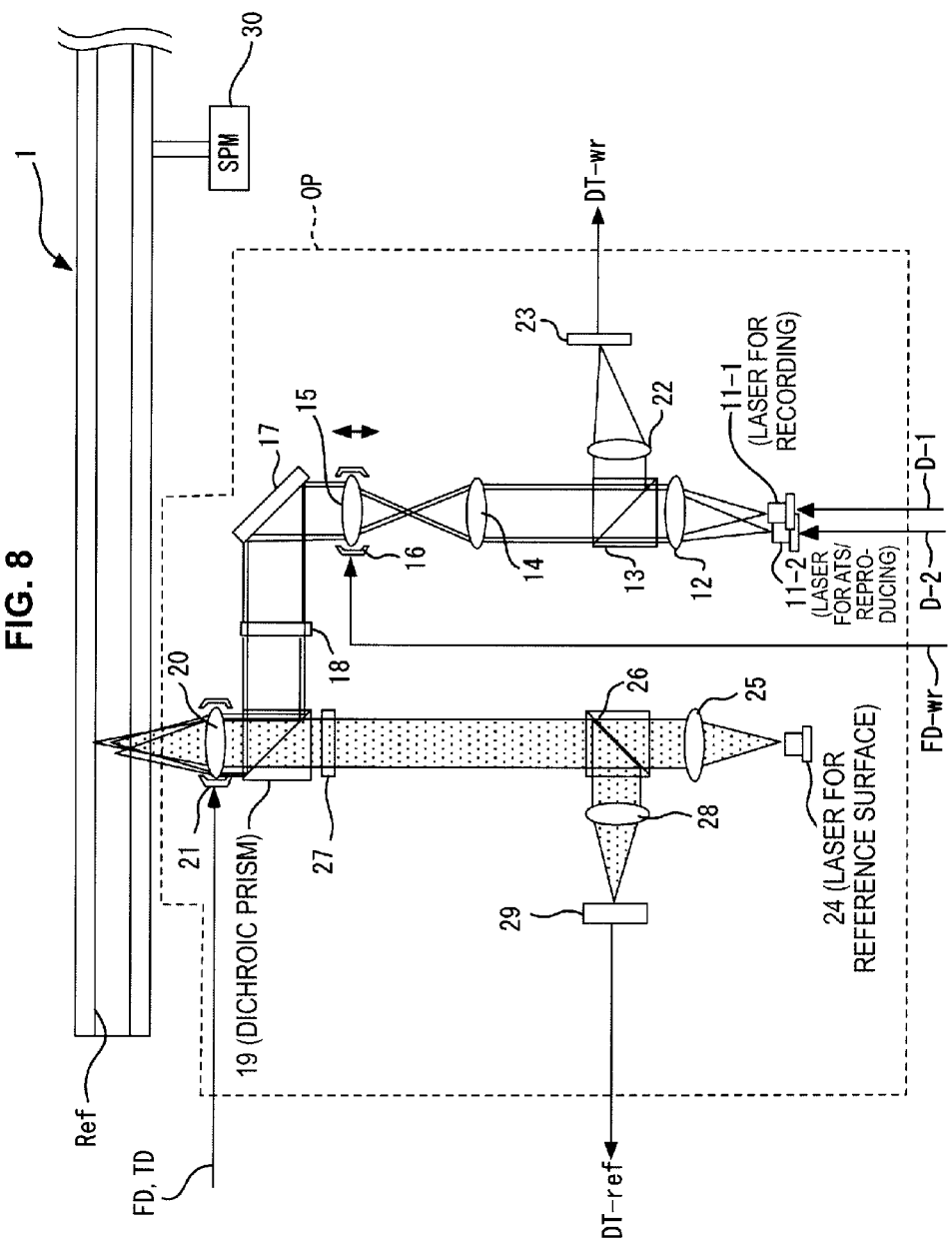
FIG. 8 is a diagram mainly illustrating a configuration of an optical system included in a position control apparatus in the case in which the ATS+ is adopted.

FIG. 8 is a diagram mainly illustrating a configuration of an optical system included in the recording/reproducing apparatus 10. Specifically, FIG. 8 mainly illustrates an internal configuration of an optical pickup OP included in the recording/reproducing apparatus 10.

First, a multi-layer recording medium 1 that is loaded on the recording/reproducing apparatus 10 is set in a state in which a center hole is clamped at a predetermined position in the recording/reproducing apparatus 10 and rotation driving by a spindle motor 30 is enabled.

In the recording/reproducing apparatus 10, the optical pickup OP is provided as a configuration to radiate laser light for recording and reproducing with respect to the multi-layer recording medium 1 driven to rotate by the spindle motor 30.

In the optical pickup OP, a laser 11-1 for recording to be a light source of the laser light for the recording described above and a laser 11-2 for ATS/reproducing to be a light source of the laser light for the ATS/reproducing are provided.

In addition, there is provided a laser 24 for the reference surface, which is a light source of the laser light for the reference surface to be the light to perform the position control using the position guider formed in the reference surface Ref.

In the optical pickup OP, an objective lens 20 that becomes an output end of the laser light for the recording, the laser light for the ATS/reproducing, and the laser light for the reference surface with respect to the multi-layer recording medium 1 is provided. In the optical pickup OP, a light receiving unit 23 for a recording layer to receive reflection light of the laser light for the ATS/reproducing from the multi-layer recording medium 1 and a light receiving unit 29 for servo light to receive reflection light of the laser light for the reference surface from the multi-layer recording medium 1 are further provided.

In the optical pickup OP, an optical system that guides the laser light for the recording and the laser light for the ATS/reproducing to the objective lens 20 and guides reflection light from the multi-layer recording medium 1 incident on the objective lens 20 to the light receiving unit 23 for the recording layer is formed.

Specifically, the laser light for the recording emitted from the laser 11-1 for the recording and the laser light for the ATS/reproducing emitted from the laser 11-2 for the ATS/reproducing are converted to become parallel light through a collimate lens 12 and are incident on a polarization beam splitter 13. The polarization beam splitter 13 is configured to transmit the laser light for the recording and the laser light for the ATS/reproducing incident from the side of the light source.

The laser light for the recording and the laser light for the ATS/reproducing that have been transmitted through the polarization beam splitter 13 are incident on a focus mechanism including a fixed lens 14, a movable lens 15, and a lens driving unit 16. The focus mechanism is provided to adjust focusing positions with respect to the laser light for the recording functioning and the laser light for the ATS/reproducing. The fixed lens 14 is disposed on the side closer to the light source of the laser light, the movable lens 15 is disposed on the side distant from the light source, and the movable lens 15 is driven by the lens driving unit 16, in a direction parallel to an axis of the laser light.

The laser light for the recording and the laser light for the ATS/reproducing that have been transmitted through the fixed lens 14 and the movable lens 15 forming the focus mechanism are reflected by a mirror 17 and are incident on a dichroic prism 19 through a ¼ wavelength plate 18.

The dichroic prism 19 is configured such that a selection reflection surface thereof reflects light having the same wavelength band as the laser light for the recording and the laser light for the ATS/reproducing and transmits light having the other wavelengths. Therefore, the laser light for the recording and the laser light for the ATS/reproducing that are incident as described above are reflected by the dichroic prism 19.

Figure 15:
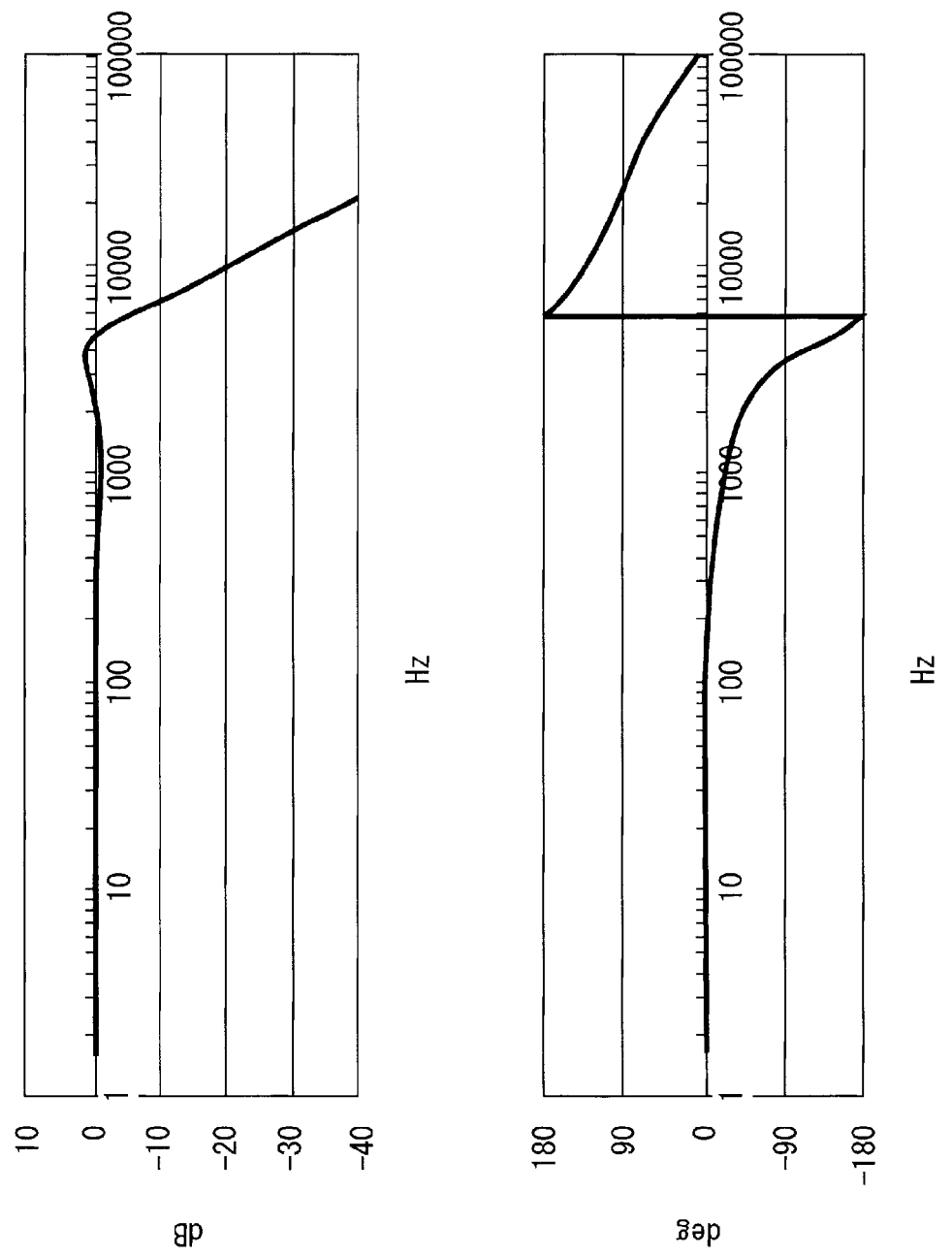
FIG. 15 is a diagram illustrating a closed-loop characteristic of an ATS loop when the open-loop characteristic illustrated in FIG. 14 is set.

The laser light for the recording and the laser light for the ATS/reproducing that are reflected by the dichroic prism 19 are radiated (focused) with respect to the multi-layer recording medium 1 (necessary recording layer 3) through the objective lens 20, as illustrated in FIG. 15.

With respect to the objective lens 20, a lens actuator 21 that holds the objective lens 20 at least in a focus direction (direction adjacent to the multi-layer recording medium 1) and a tracking direction (direction orthogonal to the focus direction: disc radius direction) such that displacement is enabled is provided.

The biaxial actuator 21 includes a focus coil and a tracking coil. The biaxial actuator 21 displaces the objective lens 20 in the focus direction and the tracking direction, by applying drive signals (drive signals FD and TD to be described below) to the focus coil and the tracking coil, respectively.

In this case, when the laser light for the ATS/reproducing is radiated to the multi-layer recording medium 1 as described above, reflection light of the laser light for the ATS/reproducing is obtained from the multi-layer recording medium 1 (recording layer 3 defined as the reproducing object).

The reflection light of the laser light for the ATS/reproducing that is obtained as described above is guided to the dichroic prism 19 through the objective lens 20 and is reflected by the dichroic prism 19.

The reflection light of the laser light for the ATS/reproducing that is reflected by the dichroic prism 19 passes through the ¼ wavelength plate 18→the mirror 17→the focus mechanism (the movable lens 15→the fixed lens 14) and is incident on the polarization beam splitter 13.

As such, the reflection light of the laser light for the ATS/reproducing that is incident on the polarization beam splitter 13 passes through the ¼ wavelength plate two times on a forward path and a backward path and a polarization direction of the reflection light is rotated by 90 degrees as compared with forward path light. As a result, the reflection light of the laser light for the ATS/reproducing that is incident as described above is reflected by the polarization beam splitter 13.

The reflection light of the laser light for the ATS/reproducing that is reflected by the polarization beam splitter 13 is focused on a light reception surface of the light receiving unit 23 for the recording layer through a condensing lens 22.

In this case, a light reception signal that is obtained by receiving the reflection light of the laser light for the ATS/reproducing by the light receiving unit 23 for the recording layer is hereinafter represented as a light reception signal DT-wr.

In the optical pickup OP, an optical system that guides the laser light for the reference surface emitted from the laser 24 for the reference surface to the objective lens 20 and guides the reflection light of the laser light for the reference surface from the multi-layer recording medium 1 incident on the objective lens 20 to the light receiving unit 29 for the servo is formed.

As illustrated in FIG. 15, the laser light for the reference surface that is emitted from the laser 24 for the reference surface is converted to become parallel light through the collimate lens 25 and is incident on the polarization beam splitter 26. The polarization beam splitter 26 is configured to transmit the laser light (forward path light) for the reference surface incident from the side of the laser 24 for the reference surface.

The laser light for the reference surface that has been transmitted through the polarization beam splitter 26 is incident on the dichroic prism 19 through the ¼ wavelength plate 27.

As described above, the dichroic prism 19 is configured to reflect light having the same wavelength band as the laser light for the recording and the laser light for the ATS/reproducing and transmit light having the other wavelengths. Therefore, the laser light for the reference surface transmits the dichroic prism 19 and is radiated to the multi-layer recording medium 1 (reference surface Ref) through the objective lens 20.

The reflection light (reflection light from the reference surface Ref) of the laser light for the reference surface that is obtained when the laser light for the reference surface is radiated to the multi-layer recording medium 1 passes through the objective lens 20, transmits the dichroic prism 18, and is incident on the polarization beam splitter 26 through the ¼ wavelength plate 27.

Similar to the case of the laser light for the ATS/reproducing described above, because the reflection light of the laser light for the reference surface that is incident from the side of the multi-layer recording medium 1 is incident on the polarization beam splitter 13 passes through the ¼ wavelength plate two times on a forward path and a backward path, a polarization direction of the reflection light is rotated by 90 degrees as compared with forward path light. Therefore, the reflection light of the laser light for the reference surface is reflected by the polarization beam splitter 26.

The reflection light of the laser light for the reference surface that is reflected by the polarization beam splitter 26 is focused on a light reception surface of the light receiving unit 29 for the servo light through the condensing lens 28.

In this case, a light reception signal that is obtained by receiving the reflection light of the laser light for the reference surface by the light receiving unit 29 for the servo light is hereinafter represented as a light reception signal DT-ref.

Here, as illustrated in FIG. 1, in the multi-layer recording medium 1, the reference surface Ref is provided with respect to the lower layer side of the recording layer formation region 5. For this reason, when recording is performed, the focus servo control of the objective lens 20 is performed such that the laser light for the reference surface is focused on the reference surface Ref provided on the lower layer side of the recording layer formation area. In addition, with respect to the laser light for the recording and the laser light for the ATS/reproducing, by driving the focus mechanism (lens driving unit 16) by the focus servo control based on the reflection light of the laser light for the ATS/reproducing, the collimation state of the laser light for the recording and the laser light for the ATS/reproducing incident on the objective lens 20 is adjusted such that the laser light for the recording and the laser light for the ATS/reproducing is focused on the recording layer 3 formed on the upper layer side of the reference surface Ref.

The tracking servo control of the laser light for the ATS/reproducing at the time of reproducing is performed by making the spot of the laser light for the ATS/reproducing follow the mark string formed in the recording layer 3 defined as the reproducing object. That is, the tracking servo control with respect to the laser light for the ATS/reproducing at the time of reproducing can be realized by controlling the position of the objective lens 20 on the basis of the reflection light of the laser light for the ATS/reproducing.

The focus servo control at the time of reproducing may be the same as that at the time of recording.

Figure 9:
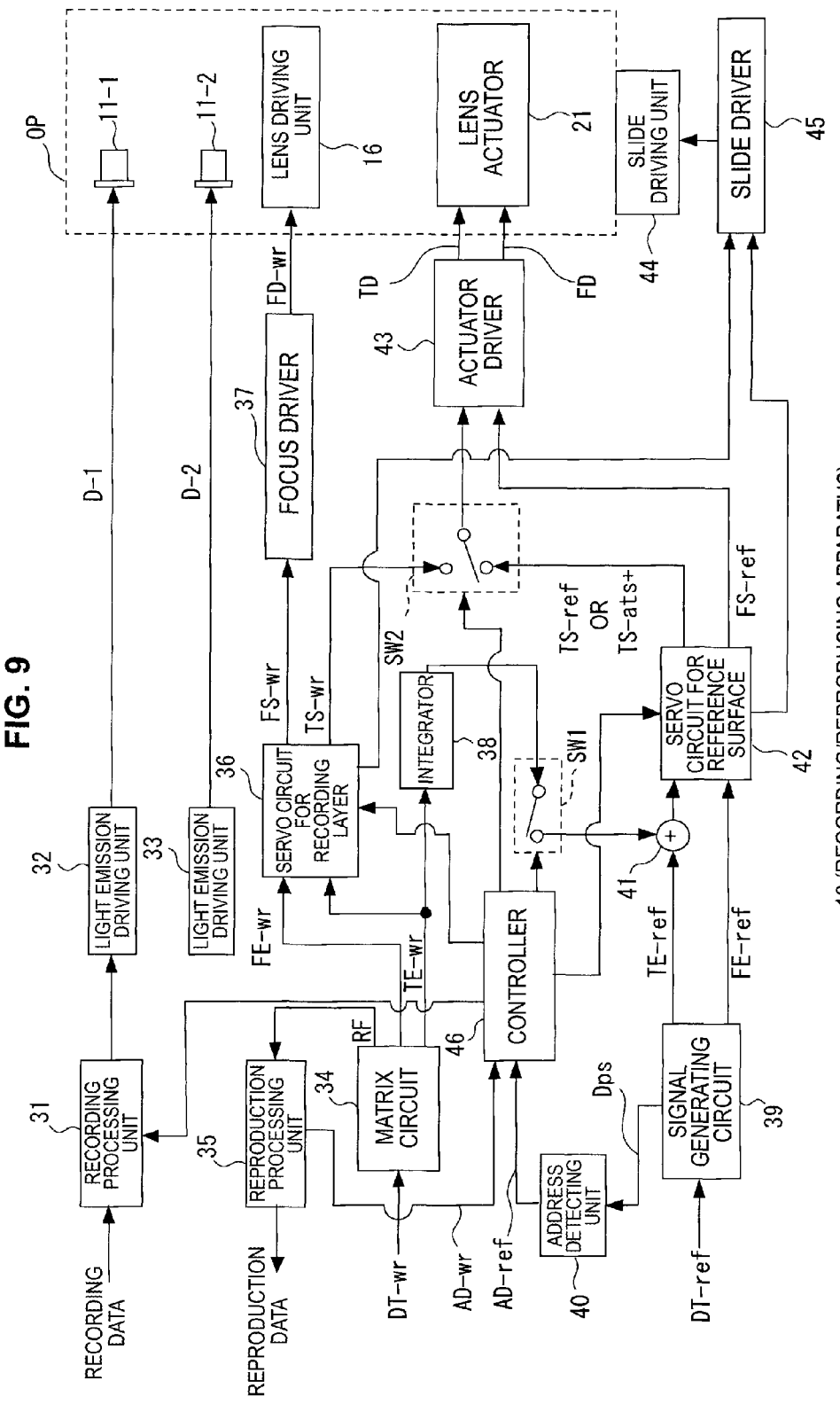
FIG. 9 is a diagram illustrating an entire internal configuration of the position control apparatus in the case in which the ATS+ is adopted.

FIG. 9 illustrates an entire internal configuration of the recording/reproducing apparatus 10 according to the embodiment.

In FIG. 9, with respect to the internal configuration of the optical pickup OP, only the laser 11-1 for the recording, the laser 11-2 for the ATS/reproducing, the lens driving unit 16, and the lens actuator 21 are extracted from the configuration illustrated in FIG. 8 and are illustrated.

In FIG. 9, the illustration of the spindle motor 30 illustrated in FIG. 8 is omitted.

In FIG. 9, a recording processing unit 31, a light emission driving unit 32, a light emission driving unit 33, a matrix circuit 34, a reproduction processing unit 35, a servo circuit 36 for a recording layer, a focus driver 37, an integrator 38, a signal generating circuit 39, an address detecting unit 40, an adder 41, a servo circuit 42 for a reference surface, an actuator driver 43, a slide driving unit 44, a slide driver 45, and a controller 46 are provided outside the optical pickup OP in the recording/reproducing apparatus 10.

The recording processing unit 31 generates a recording modulation code according to input recording data. Specifically, the recording processing unit 31 executes a process for adding an error correction code or a predetermined recording modulation coding process with respect to the input recording data and obtains a recording modulation code string to be a binary data string of "0" and "1" to be actually recorded with respect to the recording layer Ln.

At this time, the recording processing unit 31 also executes an addition process of address information (recording layer address AD_wr) with respect to the recording data, according to an instruction from a controller 46 to be described below.

The recording processing unit 31 provides a recording signal based on the generated recording modulation code string to the light emission driving unit 32.

The light emission driving unit 32 generates a laser drive signal D-1 based on the recording signal input from the recording processing unit 31 at the time of recording and drives light emission of the laser 11-1 for the recording on the basis of the drive signal D-1. Thereby, a mark string according to the recording data can be recorded with respect to the recording layer Ln.

The light emission driving unit 33 makes the laser 11-2 for the ATS/reproducing continuously emit light by reproduction power, according to a laser drive signal D-2.

Figure 11:
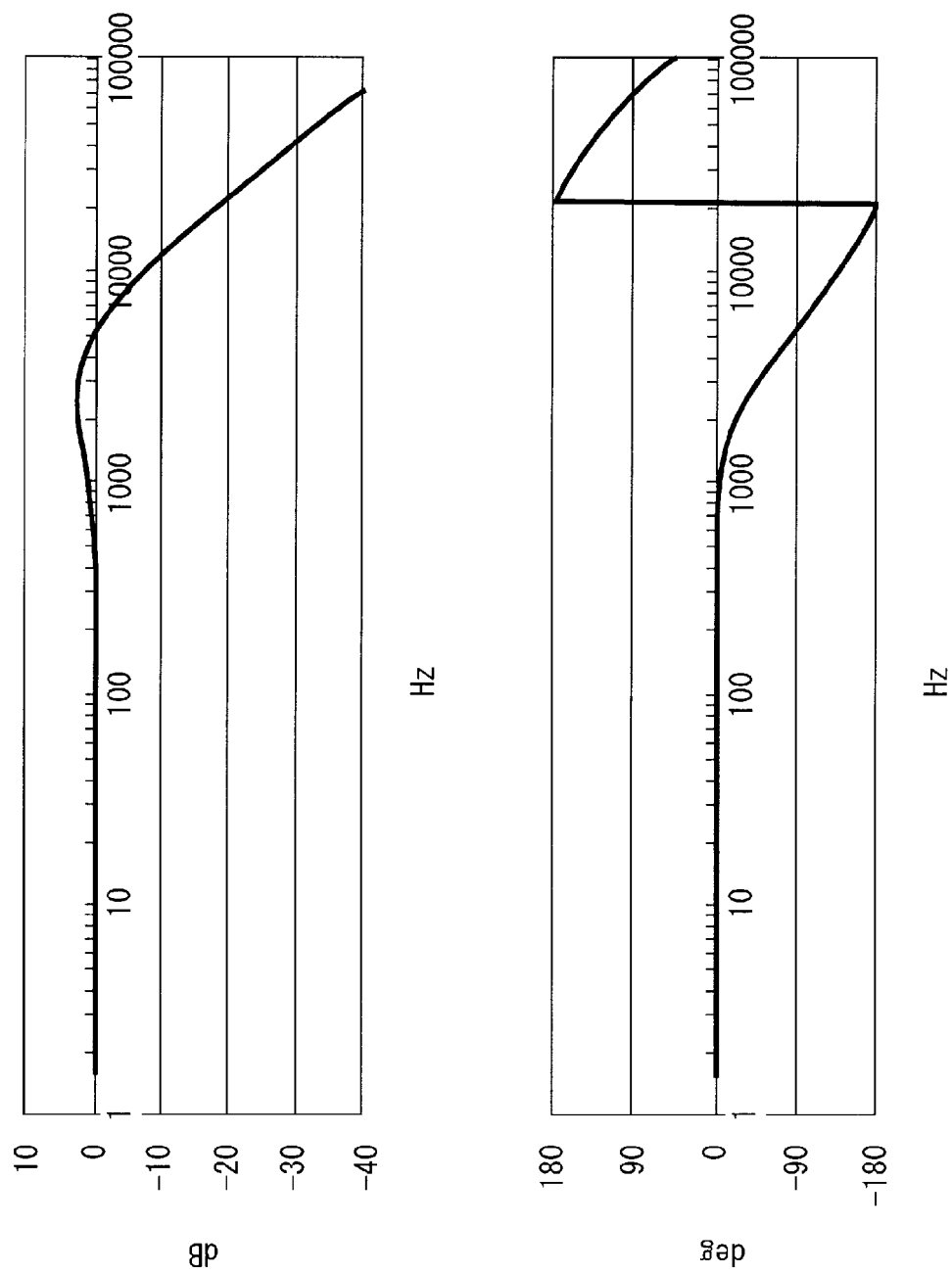
FIG. 11 is a diagram illustrating a frequency characteristic of a reference surface loop.

The matrix circuit 34 generates an RF signal (reproduction signal), a focus error signal FE-wr, and a tracking error signal TE-wr, on the basis of light reception signals DT-wr (output currents) from a plurality of light receiving elements functioning as the light receiving unit 23 for the recording layer illustrated in FIG. 11.

The focus error signal FE-wr becomes a signal that shows focus error of the laser light for the ATS/reproducing with respect to the recording layer 3 (Ln) defined as the recording/reproducing target. In addition, the tracking error signal TE-wr becomes a signal that shows position error of a radial direction of a spot position of the laser light for the ATS/reproducing with respect to the track formed in the recording layer Ln.

In the case of this example, a tracking error signal based on a differential phase detection (DPD) method is generated as the tracking error signal TE-wr.

As understood from the above description, in this example, the focus servo control with respect to the laser light for the recording layer is performed on the basis of the reflection light of the laser light for the recording/reproducing and the laser light for the ATS/reproducing (the lens driving unit 16 is set as a control target). For this reason, the focus error signal FE-wr is used in both the recording and the reproducing.

The tracking error signal TE-wr is used for the tracking servo control as the ATS+ at the time of recording and the tracking servo control to make the laser light for the ATS/reproducing follow the reproduction target mark string on the recording layer Ln at the time of reproducing.

The RF signal obtained by the matrix circuit 34 is supplied to the reproduction processing unit 35 and the focus error signal FE-wr and the tracking error signal TE-wr are supplied to the servo circuit 36 for the recording layer.

The tracking error signal TE-wr is also input to the integrator 38.

The reproduction processing unit 35 executes a binarization process with respect to the RF signal and a predetermined demodulation process such as recording modulation code decoding or an error correction process and obtains reproduction data obtained by restoring the recording data.

The reproduction processing unit 35 also executes a reproducing (detection) process with respect to the recording layer address AD_wr inserted into the recording data. The recording layer address AD_wr that is detected by the reproduction processing unit 35 is supplied to the controller 46.

The servo circuit 36 for the recording layer executes a servo operation process with respect to the focus error signal FE-wr and the tracking error signal TE-wr and generates a focus servo signal FS-wr and a tracking servo signal TS-wr.

Here, the tracking servo control of the objective lens 20 when reproducing is performed is performed on the basis of only the reflection light from the recording layer Ln. That is, the tracking servo signal TS-wr that is generated by the servo circuit 36 for the recording layer is used when reproducing is performed.

The tracking servo signal TS-wr is supplied to a switch SW2 to be described below.

Meanwhile, the focus servo signal FS-wr is supplied to the focus driver 37. The focus driver 37 generates a focus drive signal FD-wr based on the focus servo signal FS-wr and drives the lens driving unit 16 on the basis of the focus drive signal FD-wr.

Thereby, the focus servo control with respect to the laser light for the recording and the laser light for the ATS/reproducing (focus servo control to focus the laser light for the recording and the laser light for the ATS/reproducing on the recording layer 3) is realized.

Here, the servo circuit 36 for the recording layer is configured to perform the control with respect to the slide movement of the optical pickup OP by the slide driving unit 44. The slide driving unit 44 holds the entire optical pickup OP to be slid in a tracking direction.

At the time of reproducing, the servo circuit 36 for the recording layer extracts a low frequency component of the tracking error signal TE-wr, generates a slide error signal, and generates a slide servo signal based on the slide error signal. By providing the slide servo signal to the slide driver 45 and driving the slide driving unit 44, the slide servo control of the optical pickup OP is realized.

The servo circuit 36 for the recording layer provides a control signal according to an instruction from the controller 46 to the slide driver 45 and realizes necessary slide movement of the optical pickup OP by the slide driving unit 44.

The servo circuit 36 for the recording layer turns off the tracking servo according to an instruction from the controller 46, outputs a jump pulse to make the spot of the laser light for the ATS/reproducing jump to other track to the switch SW2, and performs execution control of a track jump operation.

The integrator 38 corresponds to the integrator illustrated in FIG. 7 and integrates the tracking error signal TE-wr. An integration output from the integrator 38 is supplied to a switch SW1.

Next, a signal processing system regarding a light reception signal DT-ref that is obtained by receiving the reflection light of the laser light for the reference surface will be described.

The signal generating circuit 39 generates a focus error signal FE-ref, a tracking error signal TE-ref, and an address detection signal Dps to detect absolution position information (radius position information and rotation angle information: reference surface address AD-ref) recorded on the reference surface Ref, on the basis of the light reception signals DT-ref from the plurality of light receiving elements in the light receiving unit 29 for the reference surface illustrated in FIG. 8.

The focus error signal FE-ref is a signal that shows focus error of the laser light for the reference surface with respect to the reference surface Ref (reflection surface of the reflection film 7). The tracking error signal TE-ref is a signal that shows tracking direction position error of a spot position of the laser light for the reference surface with respect to the position guider (track) formed in the reference surface Ref.

A sum signal is generated as the address detection signal Dps, when the reference surface address AD-ref is recorded by the pit strings. Alternatively, a push-pull signal is generated as the address detection signal Dps, when the reference surface address AD-ref is recorded by wobbling grooves.

The address detection signal Dps is supplied to the address detecting unit 40. The address detecting unit 40 detects the reference surface address AD-ref recorded on the reference surface Ref, on the basis of the address detection signal Dps. The detected reference surface address AD-ref is supplied to the controller 46.

The focus error signal FE-ref that is generated by the signal generating circuit 39 is supplied to the servo circuit 42 for the reference surface.

The tracking error signal TE-ref that is generated by the signal generating circuit 39 is input to the adder 41. When the switch SW1 is turned on, the integration output from the integrator 38 is input to the adder 41. Thereby, the tracking error signal TE-ref and the integration output are added.

An output of the adder 41 is supplied to the servo circuit 42 for the reference surface.

The servo circuit 42 for the reference surface executes a servo operation process with respect to the focus error signal FE-ref and generates a focus servo signal FS-ref. The servo circuit 42 for the reference surface executes the servo operation process with respect to an output signal (a tracking error signal TE-ref or an addition signal of the tracking error signal TE-ref and the integration output of the integrator 38) of the adder 41 and generates a tracking servo signal TS (TS-ref or TS-ats+).

The focus servo signal FS-ref is supplied to the actuator driver 43.

The tracking servo signal TS-ref or the tracking servo signal TS-ats+ is supplied to the switch SW2 described above.

The actuator driver 43 generates a focus drive signal FD on the basis of the focus servo signal FS-ref, drives a focus coil of the lens actuator 21 on the basis of the focus drive signal FD, and realizes the focus servo control with respect to the objective lens 20.

In addition, the actuator driver 43 generates a tracking drive signal TD on the basis of the tracking servo signal TS-wr or the tracking servo signal TS (TS-ref or TS-ats+) output from the switch SW2, drives the tracking coil of the lens actuator 21 on the basis of the tracking drive signal TD, and realizes the tracking servo control with respect to the objective lens 20.

Specific switching control of the switch SW2 will be described below.

The servo circuit 42 for the reference surface turns off a tracking servo loop according to an instruction from the controller 46, outputs a jump pulse to make the spot of the laser light for the reference surface jump to other spot to the switch SW2, and performs execution control of a track jump operation.

The servo circuit 42 for the reference surface controls a slide operation of the slide driving unit 44, according to an instruction from the controller 46. Specifically, the servo circuit 42 for the reference surface provides a control signal to make the center of the objective lens 20 matched with the center axis c (refer to FIG. 3) to the slide driver 45, during execution of the tracking servo control, and provides a control signal to the slide driver 45 such that the optical pickup OP moves to the position according to the target address, when the seek described above is performed.

As understood from the above description, aspects of the position control that is performed when recording/reproducing is performed with respect to the multi-layer recording medium 1 can be broadly divided into the following four aspects.

At the time of reference surface seek
slide movement control or track jump control on reference surface Ref
At the time of recording (during recording)
ATS+
At the time of recording layer seek (seek performed using laser light for recording layer after reference surface seek)
track jump control on at least recording layer Ln
At the time of reproducing (during reproducing)
tracking servo control based on tracking servo signal TS-wr (servo control to make laser light for ATS/reproducing follow track on recording layer Ln)

The switches SW1 and SW2 are provided to switch an output signal with respect to the actuator driver 43, according to the four aspects.

Specifically, the switch SW1 is provided to realize switching of generation of the tracking servo signal TS-ref to be used at the time of reference surface seek and generation of the tracking servo signal TS-ats+ to realize the ATS+ executed at the time of recording.

The switch SW1 is turned off by the controller 46 at the time of reference surface seek. Thereby, at the time of reference surface seek, the tracking servo signal TS-ref based on the tracking error signal TE-ref is generated by the servo circuit 42 for the reference surface and the tracking servo signal TS-ref is input to the switch SW2.

In addition, the switch SW1 is turned on by the controller 46 at the time of recording. Thereby, at the time of recording, the tracking servo signal TS-ats+ based on the addition signal of the tacking error signal TE-ref and the integration output of the integrator 38 is generated by the servo circuit 42 for the reference surface and the tracking servo signal TS-ats+ is input to the switch SW2.

Then, the switch SW2 selects an output signal from the servo circuit 42 for the reference surface from an output signal from the servo circuit 36 for the recording layer and the output signal from the servo circuit 42 for the reference surface, at the time of reference surface seek and at the time of recording. By the selection of the switch SW2 and the ON/OFF operation of the switch SW1, the tracking servo signal TS-ref is provided to the actuator driver 43 at the time of reference surface seek and the tracking servo signal TS-ats+ is provided to the actuator driver 43 at the time of recording.

In addition, the switch SW2 selects the output signal from the servo circuit 36 for the recording layer from the output signal from the servo circuit 36 for the recording layer and the output signal from the servo circuit 42 for the reference surface, at the time of recording layer seek and at the time of reproducing. Thereby, at the time of recording layer seek and at the time of reproducing, the output signal (the tracking servo signal TS-wr or the track jump pulse) from the servo circuit 36 for the recording layer is provided to the actuator driver 43.

The control of the switches SW1 and SW2 is performed, so that the position control according to the aspect corresponding to each of when reference surface seek is performed, when recording is performed, when recording layer seek is performed, and when reproducing is performed is realized.

The controller 46 is composed of a microcomputer including a central processing unit (CPU) and a memory such as a read only memory (ROM) and a random access memory (RAM). The controller 46 executes control/a process according to a program stored in the ROM and wholly controls the recording/reproducing apparatus 10.

For example, the controller 46 outputs an instruction with respect to the servo circuit 38 for the reference surface on the basis of the reference surface address AD_ref input from the address detecting unit 40 and performs seek operation control (reference surface seek operation control) to move a spot position of the laser light for the reference surface to the predetermined reference surface address AD_ref.

The controller 46 outputs an instruction with respect to the servo circuit 36 for the recording layer on the basis of the recording layer address AD_wr input from the reproduction processing unit 35 and performs seek operation control (recording layer seek operation control) to move a spot position of the laser light for the ATS/reproducing to the predetermined recording layer address AD_wr.

The controller 46 turns on the switch SW1, inputs the addition signal of the tracking error signal TE-ref and the integration output of the integrator 38 to the servo circuit 42 for the reference surface, and selects the output signal from the servo circuit 42 for the reference surface by the switch SW2, such that the tracking servo control based on the ATS+ is executed, when recording is performed.

The controller 46 selects the output signal from the servo circuit 36 for the recording layer by the switch SW2, such that the tracking servo control based on the tracking servo signal TS-wr is executed, when reproducing is performed.

<4. Detail and Problem of ATS+]

Figure 10:
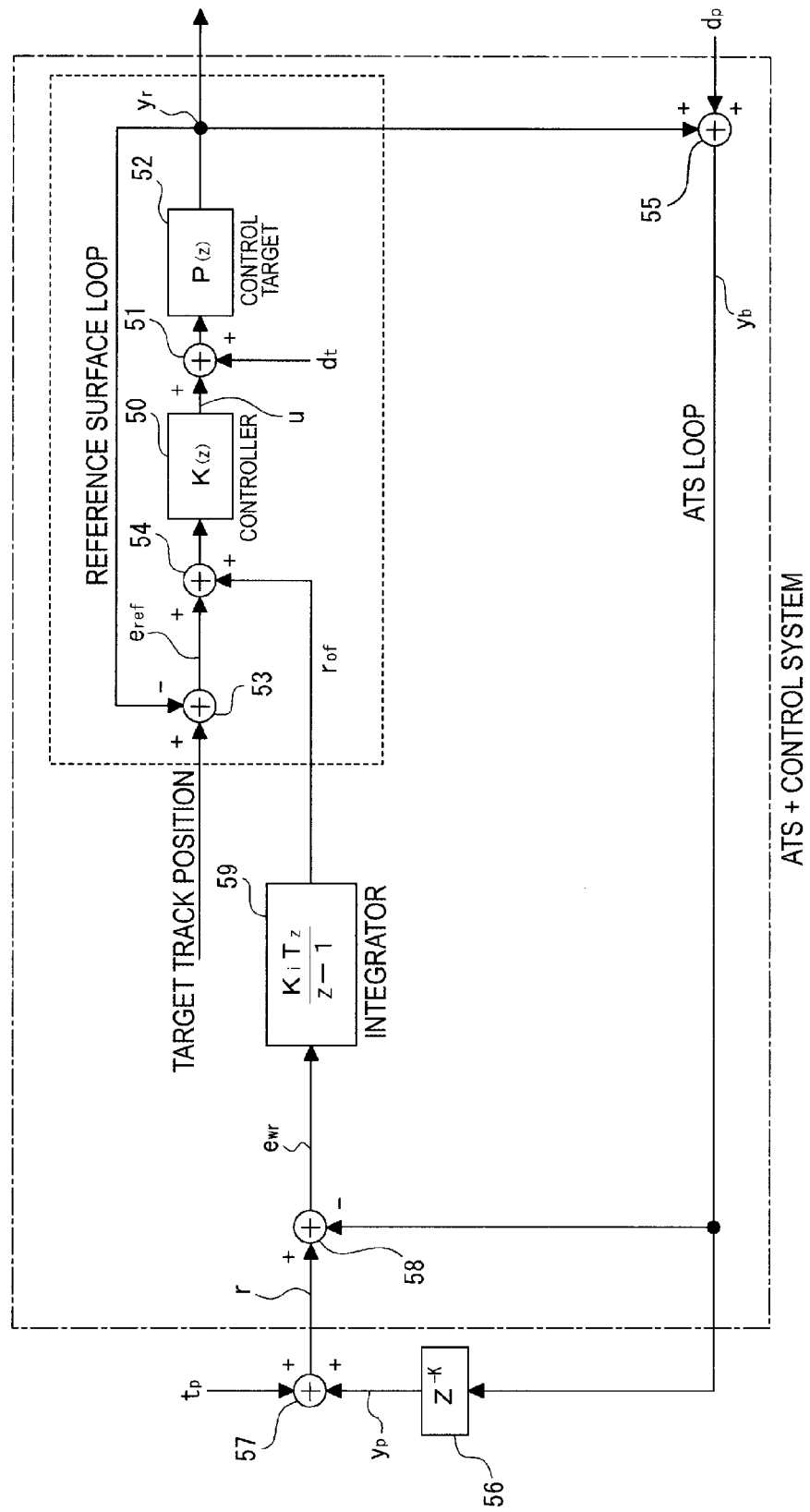
FIG. 10 is a diagram illustrating the case in which a configuration of an ATS+ control system is conceptualized.

FIG. 10 is a diagram illustrating the case in which a configuration of the ATS+ control system illustrated in FIG. 9 is conceptualized (modeled by a transfer function).

As illustrated in FIG. 10, if the ATS+ control system illustrated in FIG. 9 is conceptualized, the ATS+ control system can be configured to have a controller 50, an adder 51, a control target 52, a subtractor 53, an adder 54, an adder 55, a delay element 56, an adder 57, a subtractor 58, and an integrator 59.

The controller 50 corresponds to the servo circuit 42 for the reference surface illustrated in FIG. 9 and the control target 52 corresponds to the lens actuator 21. In addition, the integrator 59 corresponds to the integrator 38.

With respect to a discrete system transfer function of each unit of the control system illustrated in FIG. 10, a transfer function of the controller 50 is represented as "K(z)" and a transfer function of the control target 52 is represented as "P(z)". In addition, a transfer function of the integrator 59 is represented as "$(K_i Tz)/(z-1)$".

With respect to each signal in the control system, "$e_{wr}$" becomes a signal that corresponds to the tracking error signal TE-wr described in FIG. 9 (hereinafter, referred to as a tracking error signal $e_{wr}$). In addition, "$e_{ref}$" becomes a signal that corresponds to the tracking error signal TE-ref described in FIG. 9 (hereinafter, referred to as a tracking error signal $e_{ref}$).

A servo loop based on the tracking error signal $e_{wr}$ is the ATS loop and a servo loop based on the tracking error signal $e_{ref}$ is the reference surface loop.

Here, an integration output from the integrator 59 (integrator 38) is an offset of the control target value of the reference surface loop as understood from the above description and is represented as "$r_{of}$" (hereinafter, referred to as an offset "$r_{of}$").

In FIG. 10, "$y_r$" that is represented as an output from the control target 52 shows a spot position of the laser light for the reference surface.

"$y_b$" that is a position of the spot Sats for the adjacent track servo can be represented as a value obtained by adding a spot deviation $d_p$ to the spot position $y_r$ of the laser light for the reference surface (adder 55). The spot deviation $d_p$ means the deviation of the spot position of the laser light for the reference surface and the laser light for the recording layer generated by the lens shift of the objective lens 20.

The tracking error signal $e_{wr}$ is obtained as a difference of a recording completed track position r and the position $y_b$ of the spot Sats for the adjacent track servo, by the subtractor 58.

The recording completed track position r is obtained by adding an inter-spot distance $t_p$ of the spot Sats for the adjacent track servo and the spot Swr for the recording to a track position $y_D$ before one lap obtained by delaying the position $y_b$ of the spot Sats for the adjacent track servo by "$z^{-k}$" corresponding to the delay element 56 by an amount corresponding to one lap (adder 57).

The tracking error signal $e_{wr}$ obtained as described above is integrated with the integrator 59 and an output $r_{of}$ of the integrator 59 is provided to the reference surface loop (adder 54). Specifically, the output is provided with respect to the tracking error signal $e_{ref}$ corresponding to an output of the subtractor 53.

The spot position $y_r$ of the laser light for the reference surface and a target track position are input to the subtractor 53, the spot position $y_r$ of the laser light for the reference surface is subtracted from the target track position, and the tracking error signal $e_{ref}$ is generated.

Here, the target track position means an ideal track position (in an ideal state in which there is no spot $d_p$) where the spot of the laser light for the reference surface is to be located according to the advancement of recording and a value of the target track position increases with a time passage (for spiral recording). Information of the target track position can be calculated from information of the track pitch or the recording speed of the multi-layer recording medium 1.

In the ATS+ control system, the controller 50 controls the control target 52, on the basis of a signal (adder 54) obtained by providing the offset $r_{of}$ by the integrator 59 to the tracking error signal $e_{ref}$ obtained by the subtractor 53 as described above.

An output of the controller 50 is represented as "u". Torque disturbance $d_t$ is added to the output u of the controller 50 by the adder 51 and an addition result is input to the control target 52.

Here, a control system in a one-dotted chain line of FIG. 10 is first considered to recognize stability of the ATS+ control system.

With respect to the control system in the one-dotted chain line, if there is a frequency region where gain of a transfer function from a target value r (recording completed track position r) to the spot position yb becomes more than 0 dB, an error signal of a corresponding cycle may be gradually reinforced and lead to an oscillation.

A transfer function of the reference surface loop surrounded with a dotted line in FIG. 10, that is, a transfer function (frequency characteristic) from the offset $r_{of}$ to the spot position $y_r$ of the laser light for the reference surface is illustrated in FIG. 11.

In FIG. 11 and FIGS. 12 to 15, 17 to 21, 23, and 28 to 30 illustrating frequency characteristics hereinafter, a frequency/amplitude characteristic (dB) is illustrated at an upper stage and a frequency/phase characteristic (deg) is illustrated at a lower stage.

As illustrated in FIG. 11, the gain of the transfer function of the reference surface loop becomes more than 0 dB at about 1 to 5 kHz. As described above, the servo band of the reference surface loop in this example is about 4 kHz. As understood from the above description, in the reference surface loop, the gain may become more than 0 dB in the servo band.

Therefore, in order to prevent the gain from becoming more than 0 dB, a low frequency is emphasized by using the integrator in the ATS loop in the one-dotted chain line of FIG. 10, in the ATS+.

Figure 12:
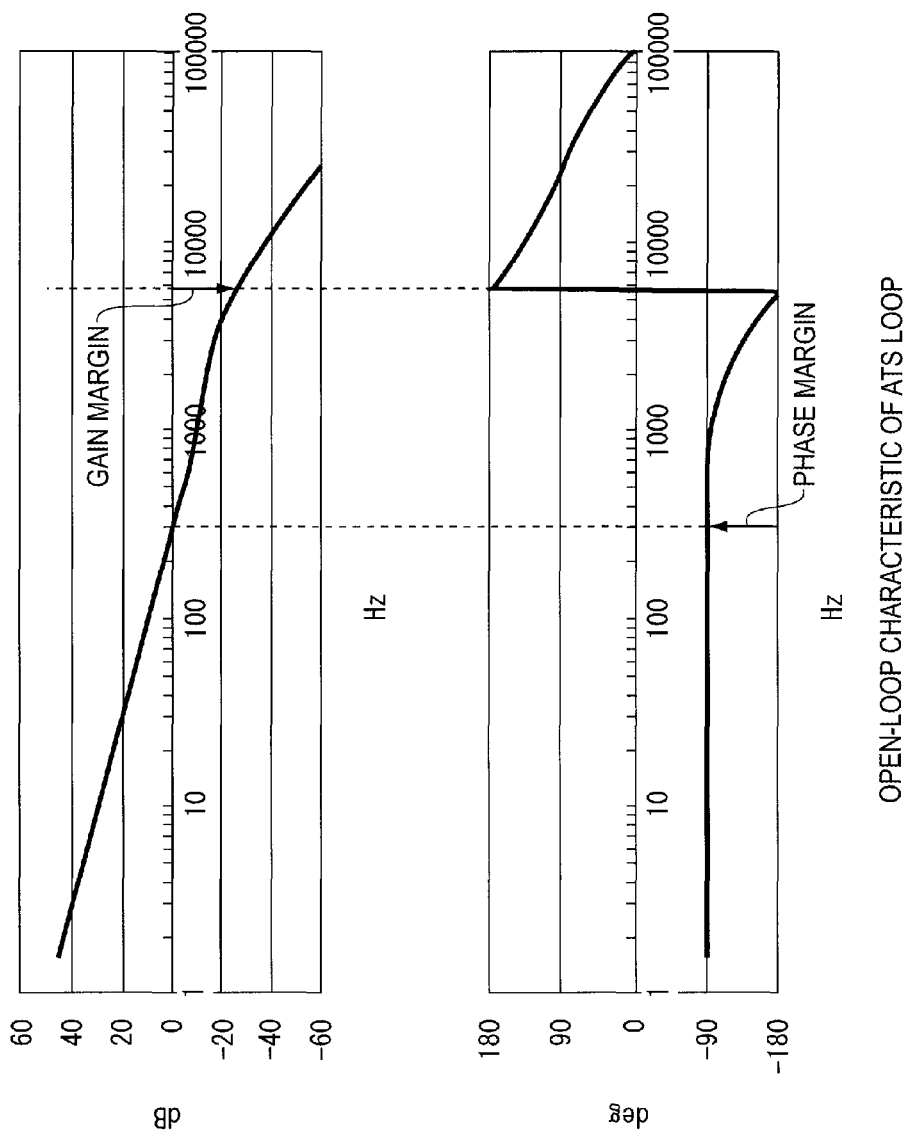
FIG. 12 is a diagram illustrating an example of an open-loop characteristic of an ATS loop.
Figure 13:
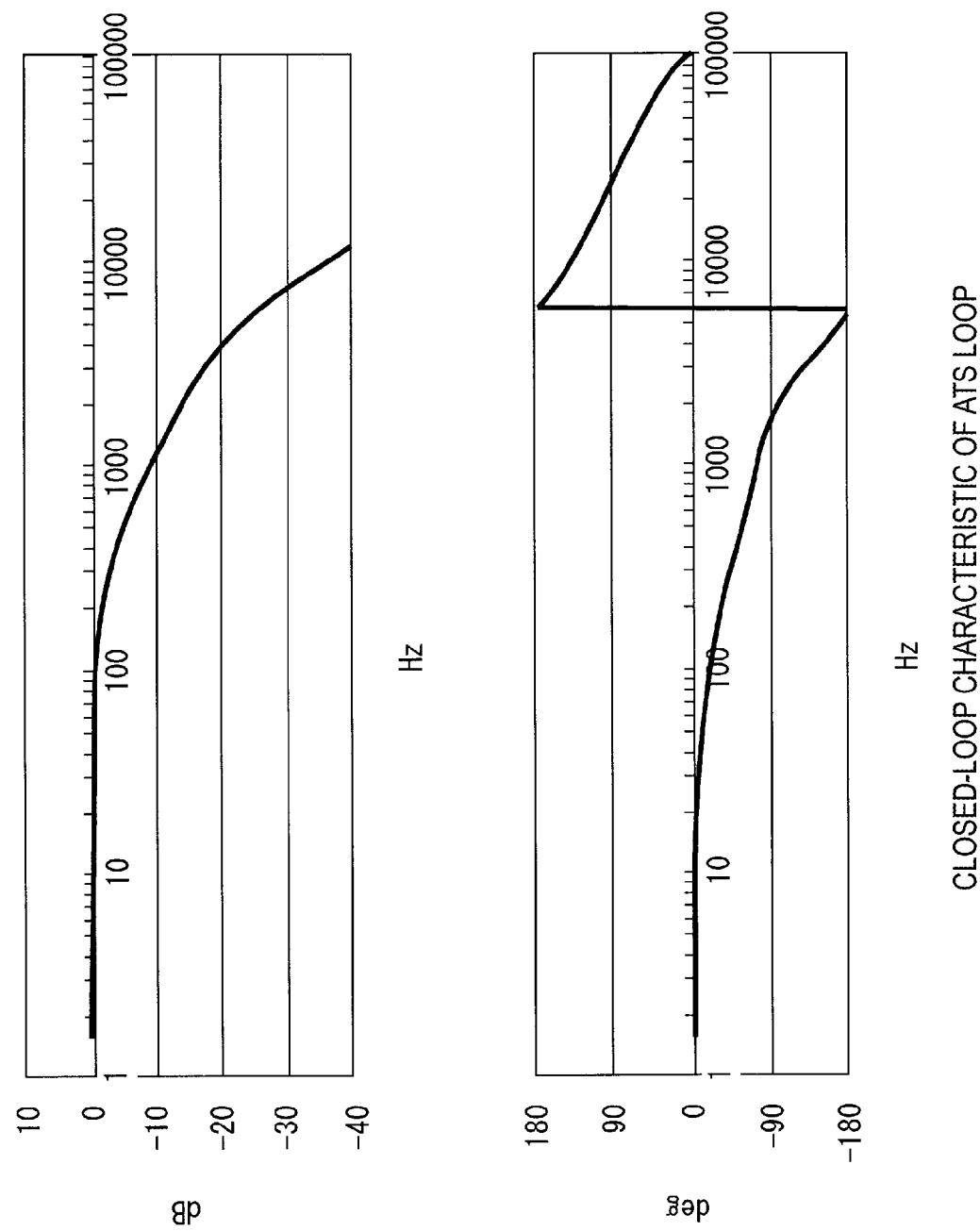
FIG. 13 is a diagram illustrating a closed-loop characteristic of an ATS loop when the open-loop characteristic illustrated in FIG. 12 is set.

FIG. 12 illustrates an example of an open-loop characteristic of the ATS loop and FIG. 13 illustrates a closed-loop characteristic of the ATS loop when the open-loop characteristic illustrated in FIG. 12 is set.

FIG. 12 illustrates a characteristic example of the case in which a gain margin and a phase margin are sufficiently obtained, as an example of the open-loop characteristic of the ATS loop. As such, when the gain margin and the phase margin are sufficiently obtained in the open-loop characteristic, in the closed-loop characteristic of the ATS loop, a frequency region where the gain becomes more than 0 dB is not generated as illustrated in FIG. 13. Thereby, the stable ATS+ control system in which the oscillation is prevented is realized.

Here, the gain margin and the phase margin are changed according to a value of the gain set to the ATS loop.

If the gain of the ATS loop is increased, that is, a value of a parameter $K_i$ of the transfer function of the integrator 59 in FIG. 10 is increased, responsiveness with respect to the spot deviation $d_p$ can be improved. As a result, track pitch irregularity of the recording track can be decreased. Thereby, the track pitch can be decreased and the recording density can be improved. Therefore, it is preferable to set the gain of the ATS loop as high as possible, in a range in which the ATS control system is stabilized.

Figure 14:
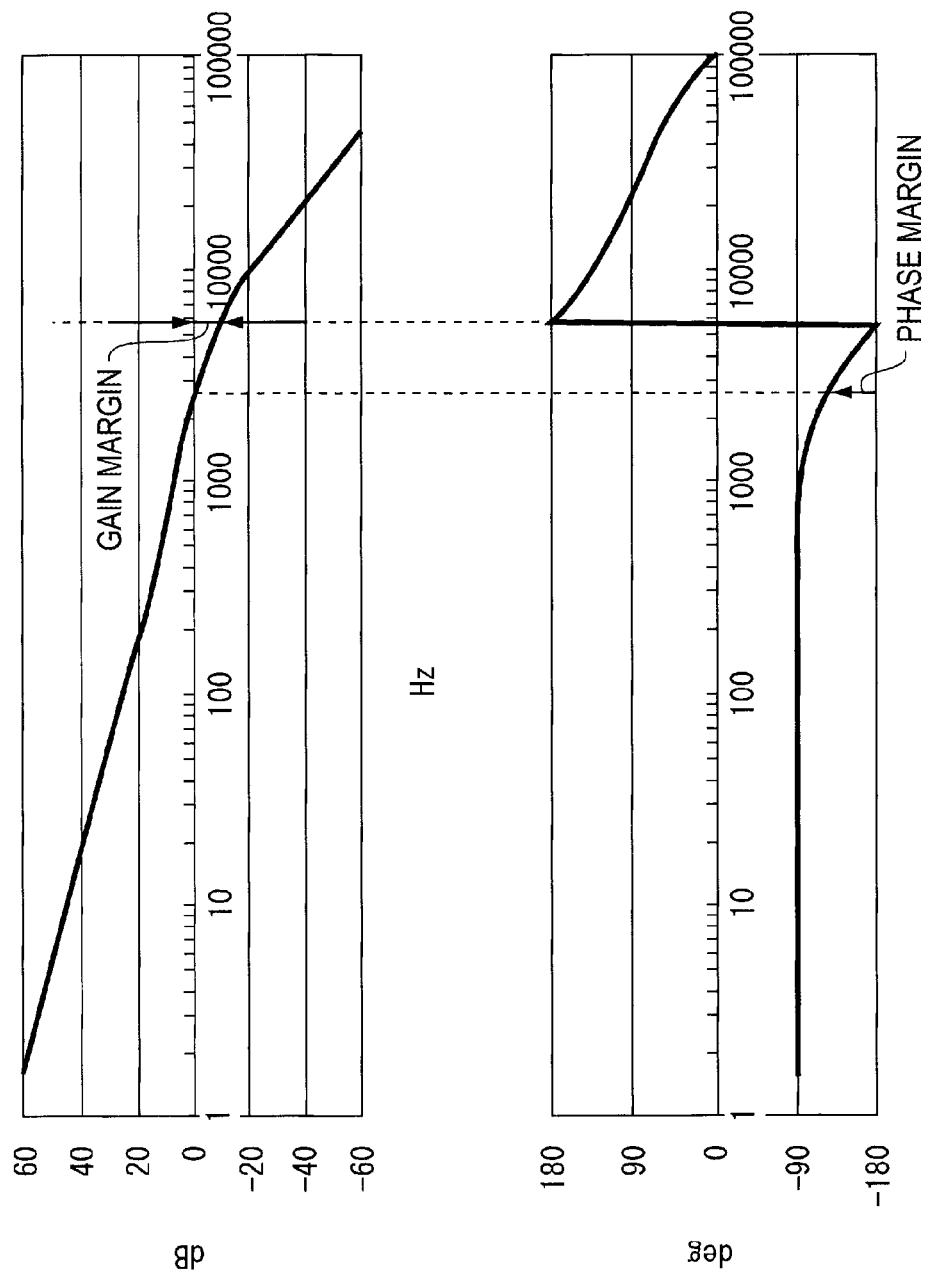
FIG. 14 is a diagram illustrating an example of an open-loop characteristic of an ATS loop when gain of an ATS loop increases.

FIG. 14 illustrates an example of an open-loop characteristic of the ATS loop when the parameter $K_t$ is sextupled (as compared with FIG. 12).

As understood from the example of FIG. 14, if the gain of the ATS loop is increased, the phase margin and the gain margin may be decreased.

FIG. 15 illustrates the closed-loop characteristic of the ATS loop when the open-loop characteristic illustrated in FIG. 14 is set.

Referring to FIG. 15, if the phase margin and the gain margin decrease, in the closed-loop characteristic of the ATS loop, a frequency region where the gain becomes more than 0 dB is generated at about 3 kHz. As a result, an operation as the ATS+ control system may become unstable.

As such, in the ATS+ control system illustrated in FIG. 10 described above, stability can be improved as compared with the case of adopting the ATS. However, because the frequency region where the gain becomes more than 0 dB may be generated, this may lead to an oscillation. For this reason, it is desired to improve stability of the operation.

<5. Position Control Method According to Embodiment>
[5-1. Feedforward Control]

The inventors have performed repeated examination zealously in view of the problems described above and have come to a method of adding a feedforward controller to a reference surface loop to adjust a closed-loop characteristic of the reference surface loop, so that gain of an ATS loop can be set high.

Figure 16:
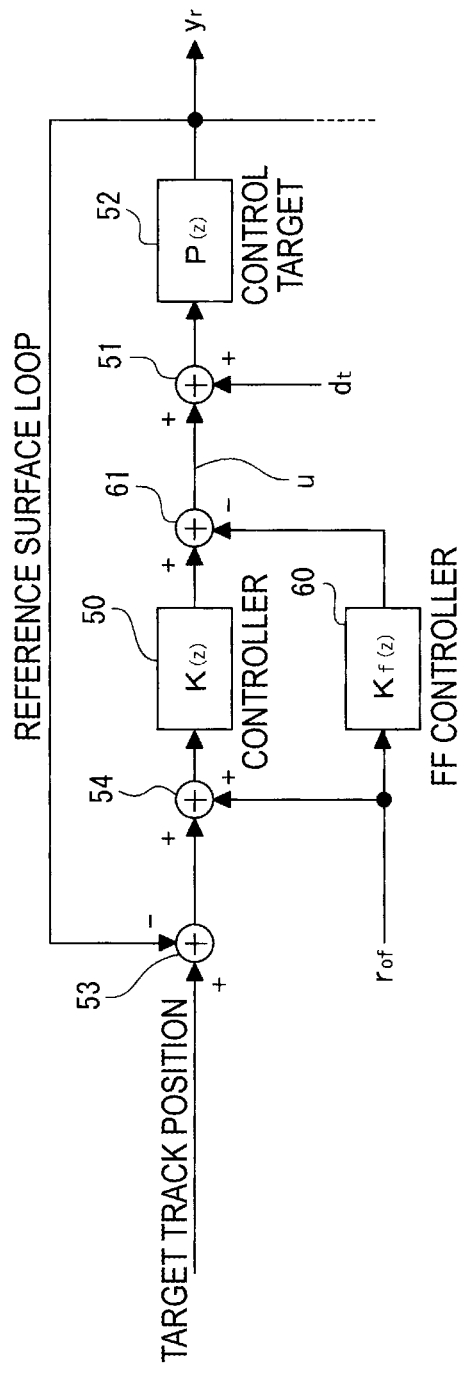
FIG. 16 is a diagram illustrating a configuration (configuration modeled by a transfer function) of an ATS+ control system to which a feedforward controller is added.

Referring to FIG. 16, a configuration (configuration modeled by the transfer function) of the ATS+ control system to which the feedforward controller is added will be described.

In FIG. 16, only a configuration of a portion corresponding to the reference surface loop among the configurations illustrated in FIG. 10 is illustrated and because configurations of the other portions of the ATS+ control system are equal to the configurations of FIG. 10, illustration thereof is omitted.

In the following description, the same portions as the portions described above are denoted with the same reference numerals and explanation thereof is omitted.

As illustrated in FIG. 16, in the ATS+ control system according to this embodiment, a feedforward (FF) controller 60 is added to the configuration illustrated in FIG. 10. Specifically, the FF controller 60 inputs the offset $r_{of}$, provides a signal characteristic by a transfer function $K_f(z)$ to the offset $r_{of}$, and provides a result thereof to the reference surface loop. An output of the FF controller 60 is added to the reference surface loop by an adder 61 disposed between the controller 50 and the adder 51.

Here, with respect to the general feedforward controller, a characteristic of from the torque disturbance $d_t$ to the spot position $y_r$ of the laser light for the reference surface does not change without depending on presence/absence of the FF controller 60. This can be easily estimated from the fact that the FF controller 60 is at the position where the transfer function $K_f(z)$ of the FF controller 60 does not affect the torque disturbance $d_t$, in FIG. 16.

From this point, according to the FF controller 60, a closed-loop characteristic of the vicinity of the servo band can be changed in a state in which a torque disturbance characteristic is maintained. That is, the transfer function of the reference surface loop can be changed in a state in which vibration and shock resistance is maintained.

As such, the transfer function of the reference surface loop can be changed. Therefore, even though the gain of the ATS loop is increased, the gain margin and the phase margin can be sufficiently secured. That is, even though the gain of the ATS loop is set relatively high from a request in the practical use, a control system in which the gain is not more than 0 dB in the closed-loop characteristic of the ATS loop (and the entire closed-loop characteristic of the ATS+ control system) can be realized.

As a result, a stable ATS+ control system in which an oscillation is prevented can be realized.

As understood from the above description, this embodiment is to make the gain of the ATS+ control system not more than 0 dB to prevent the oscillation.

As understood from this point, it is necessary to set the transfer function $K_f(z)$ of the FF controller 60 to satisfy a condition where the gain of the ATS+ control system is not more than 0 dB, by considering the ATS loop gain to be actually set.

Figure 17:
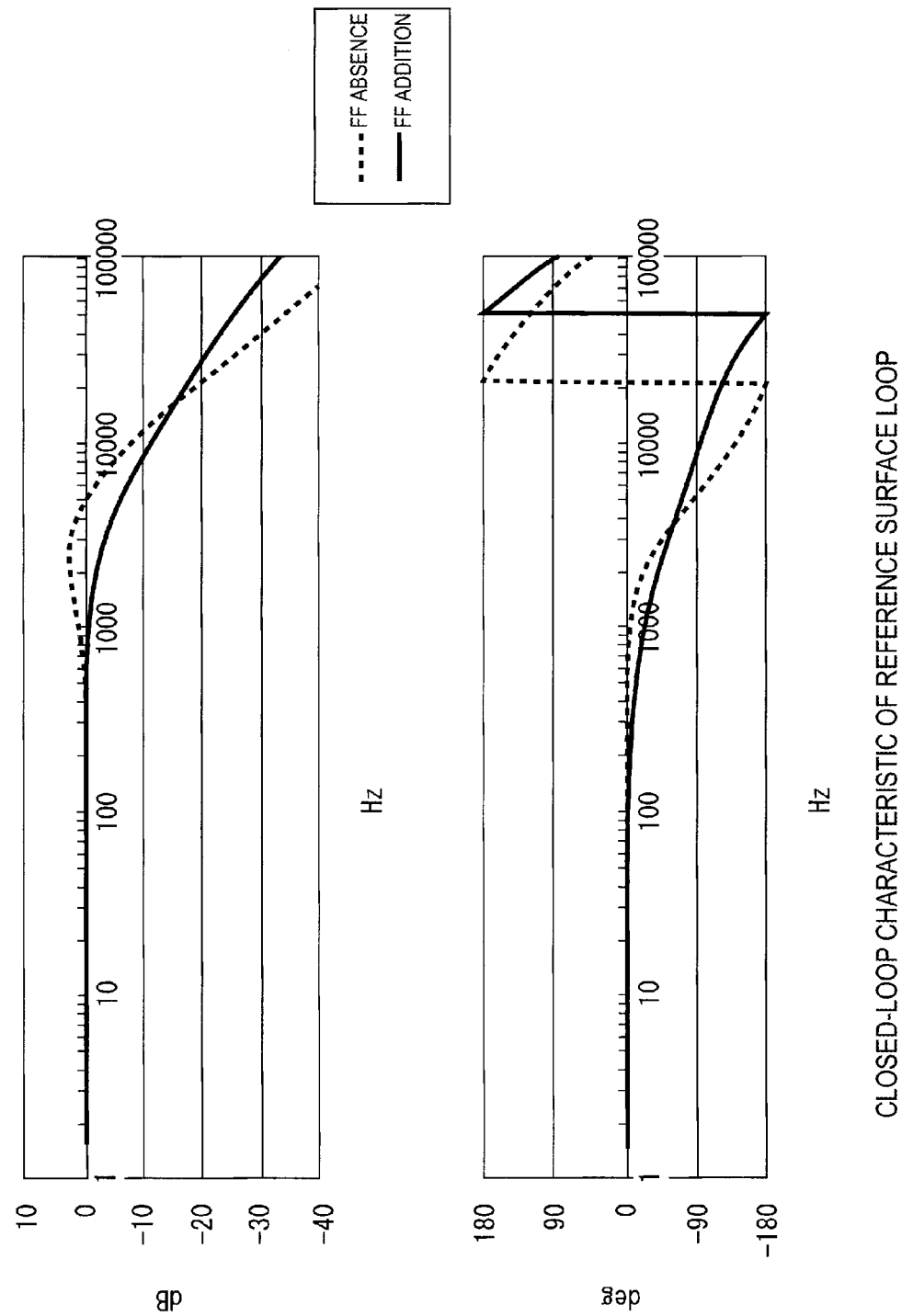
FIG. 17 is a diagram illustrating an example of a closed-loop characteristic of a reference surface loop when a characteristic of the feedforward controller is appropriately set.

An example of the closed-loop characteristic of the reference surface loop when the transfer function $K_f(z)$ of the FF controller 60 is set to satisfy the condition is illustrated in FIG. 17.

In FIG. 17, for a comparison, the closed-loop characteristic of the reference surface loop in the ATS+ control system illustrated in FIG. 10 is illustrated by a broken line ("FF absence").

As illustrated as "FF addition" in FIG. 17, the characteristic of the FF controller 60 is appropriately set, so that the gain of the vicinity of the servo band of the reference surface loop is not more than 0 dB.

Figure 18:
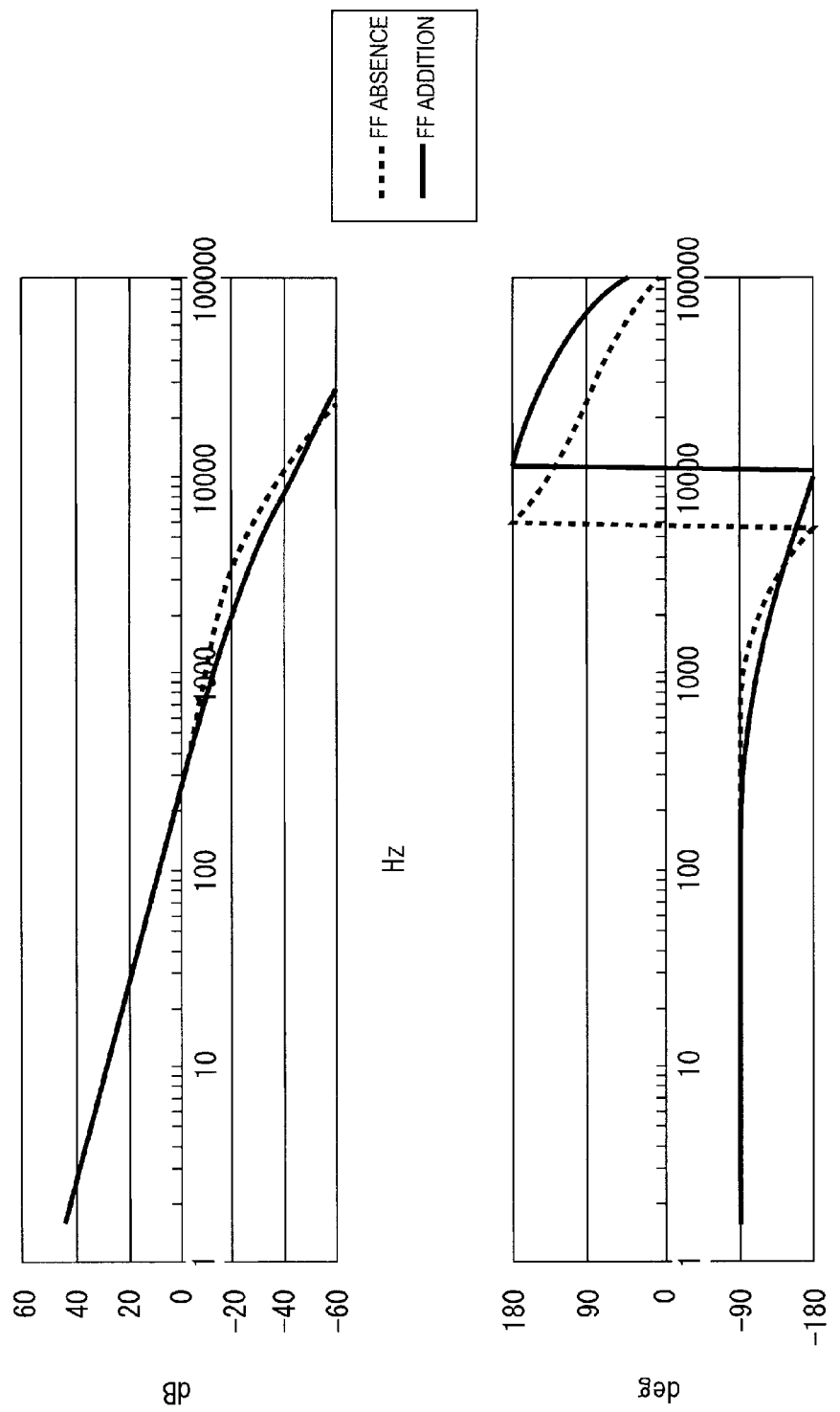
FIG. 18 is a diagram illustrating an open-loop characteristic (at the time of setting low gain) of an ATS loop when the reference surface loop characteristic of FIG. 17 is set.
Figure 19:
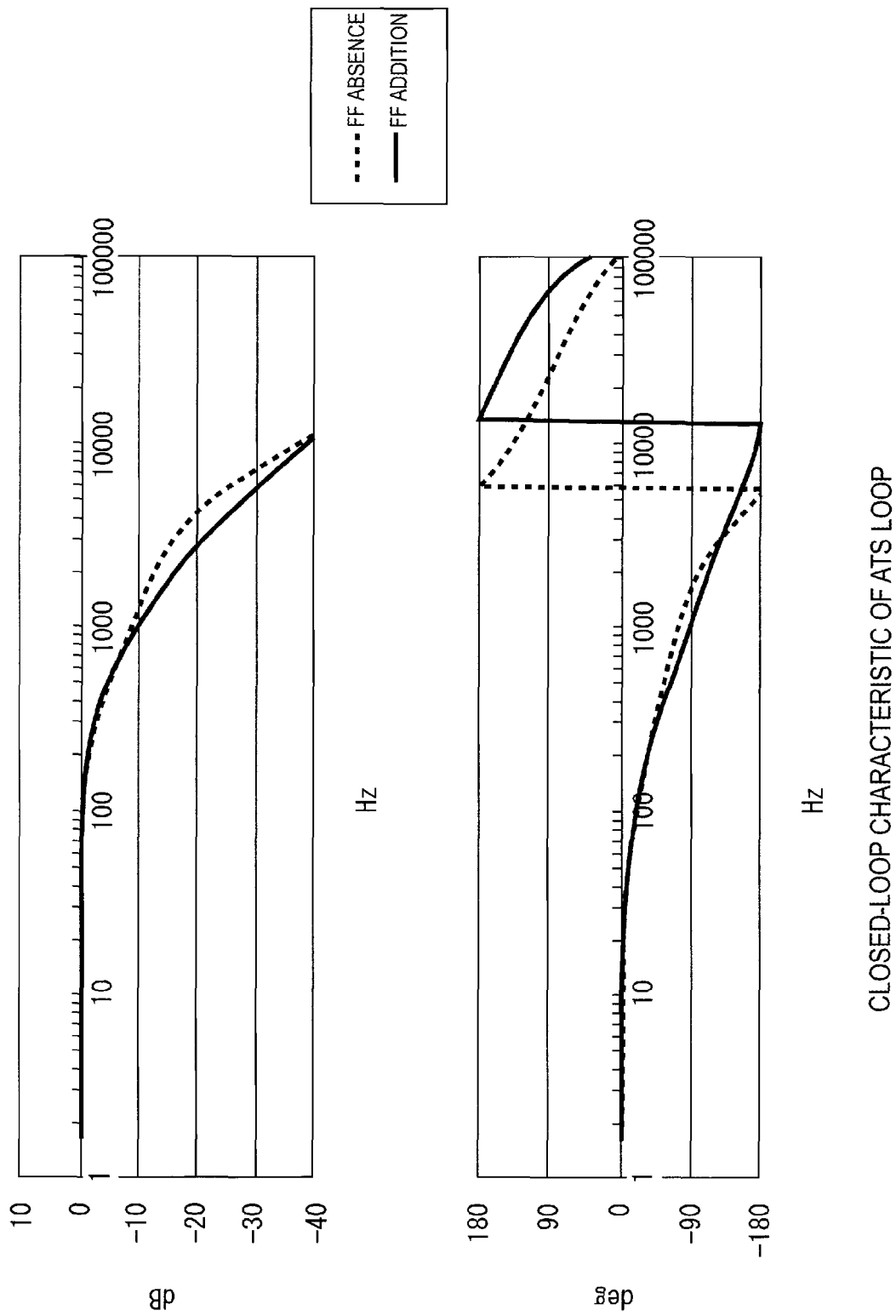
FIG. 19 is a diagram illustrating a closed-loop characteristic (at the time of setting low gain) of an ATS loop when the reference surface loop characteristic of FIG. 17 is set.

FIGS. 18 and 19 illustrate the open-loop characteristic and the closed-loop characteristic of the ATS loop when the reference surface loop characteristic of FIG. 17 is set, respectively. In FIGS. 18 and 19, a value of the gain of the ATS loop is set to the same value as the value of the gain in the case of FIG. 12 (that is, the gain is set relatively low).

In FIGS. 18 and 19, for a comparison, the characteristic of the reference surface loop in the ATS+ control system illustrated in FIG. 10 is illustrated by a broken line ("FF absence").

Referring to "FF addition" of the open-loop characteristic of FIG. 18, a phase is moderated and the gain of the ATS loop can be increased by providing the FF controller 60. Referring to FIG. 19, it can be confirmed that the gain becomes 0 dB or less, in the ATS closed-loop characteristic.

Figure 20:
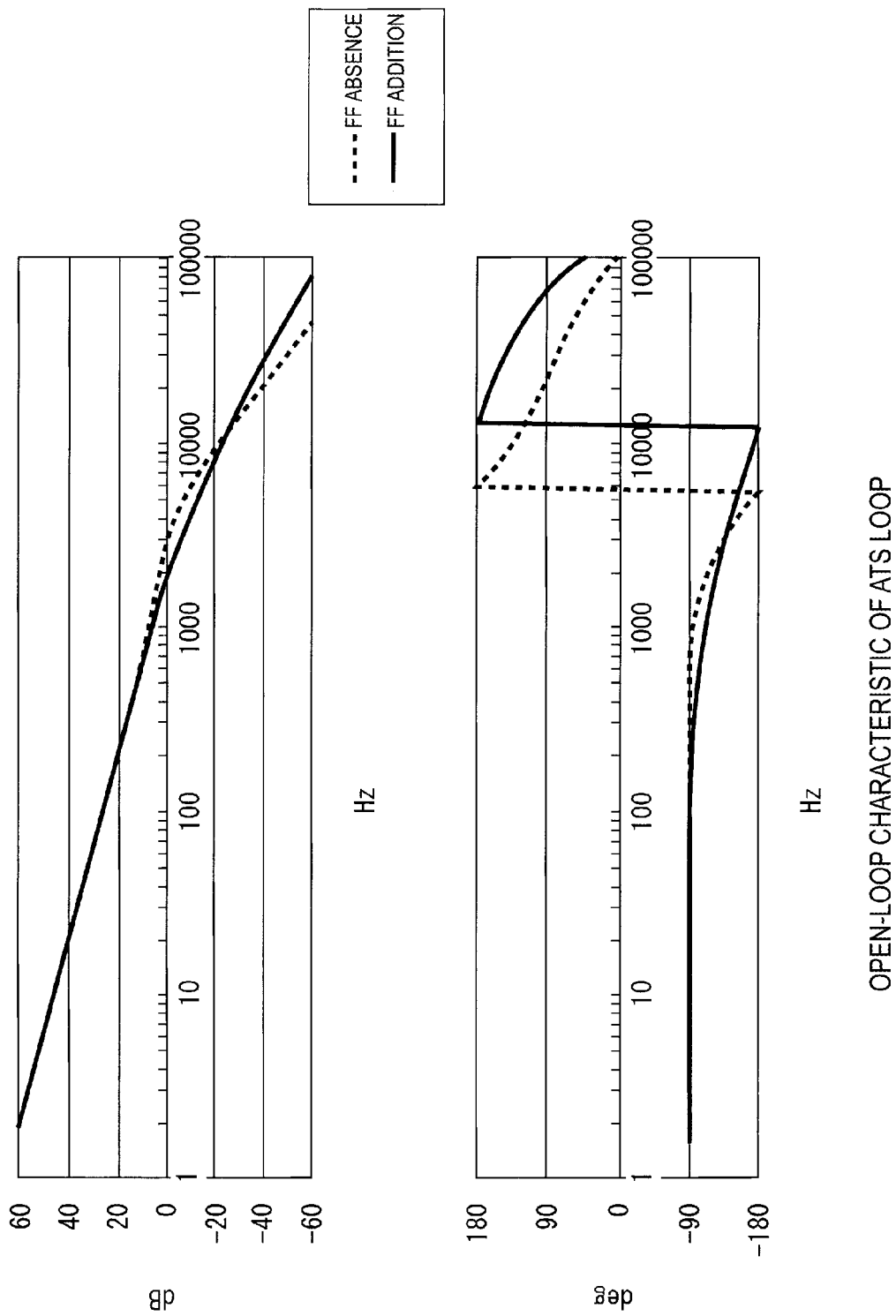
FIG. 20 is a diagram illustrating an open-loop characteristic (at the time of setting high gain) of an ATS loop when the reference surface loop characteristic of FIG. 17 is set.
Figure 21:
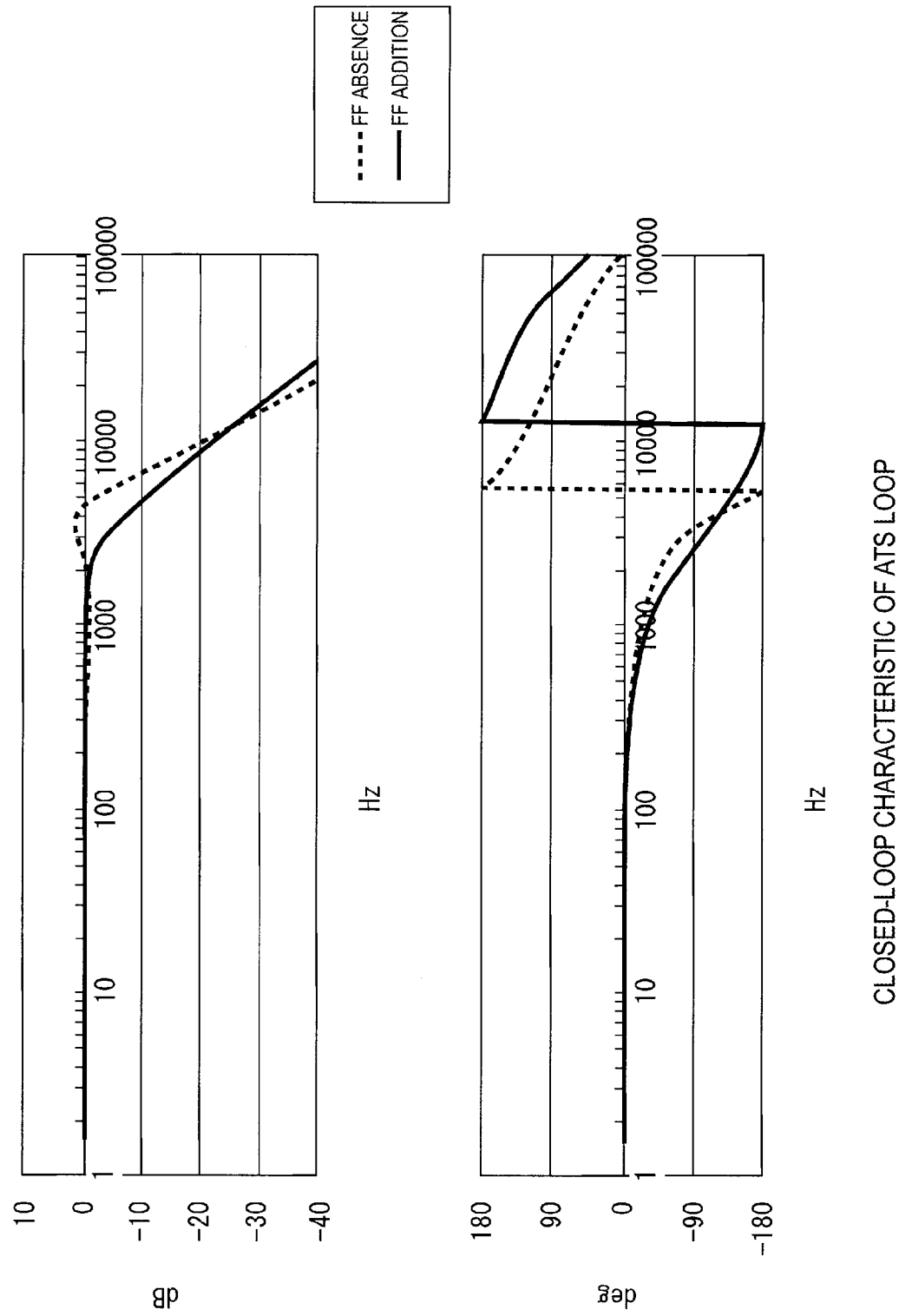
FIG. 21 is a diagram illustrating a closed-loop characteristic (at the time of setting high gain) of an ATS loop when the reference surface loop characteristic of FIG. 17 is set.

An open-loop characteristic and a closed-loop characteristic of the ATS loop when the reference surface loop characteristic of FIG. 17 is set and the gain of the ATS loop is sextupled, similar to the case of FIG. 14, after considering the above point, are illustrated in FIGS. 20 and 21, respectively.

In FIG. 20, first, referring to "FF absence", a zero cross frequency is about 3 kHz when the gain is sextupled.

For this reason, in the "FF absence", the phase margin and the gain margin decease as described above. In the closed-loop characteristic of the ATS loop, the gain becomes more than 0 dB at about 3 kHz as illustrated in FIG. 21. As a result, in the ATS+ control system, a tracking error signal may be gradually reinforced and lead to an oscillation.

Meanwhile, in the case of "FF addition" in this example, the zero cross frequency is suppressed to about 2 kHz as illustrated in FIG. 20.

Because the rapid changes of the gain and the phase are suppressed in the closed-loop characteristic of the reference surface loop as illustrated in FIG. 17, the vibration decreases in the ATS closed-loop characteristic of FIG. 21.

Thereby, according to the "FF addition" of this example, a peak more than 0 dB is not generated even though the gain of the ATS loop is increased and the ATS+ control system can be stabilized.

Here, a configuration of the actual ATS+ control system based on the control system model illustrated in FIG. 16 will be described with reference to FIG. 22.

Figure 22:
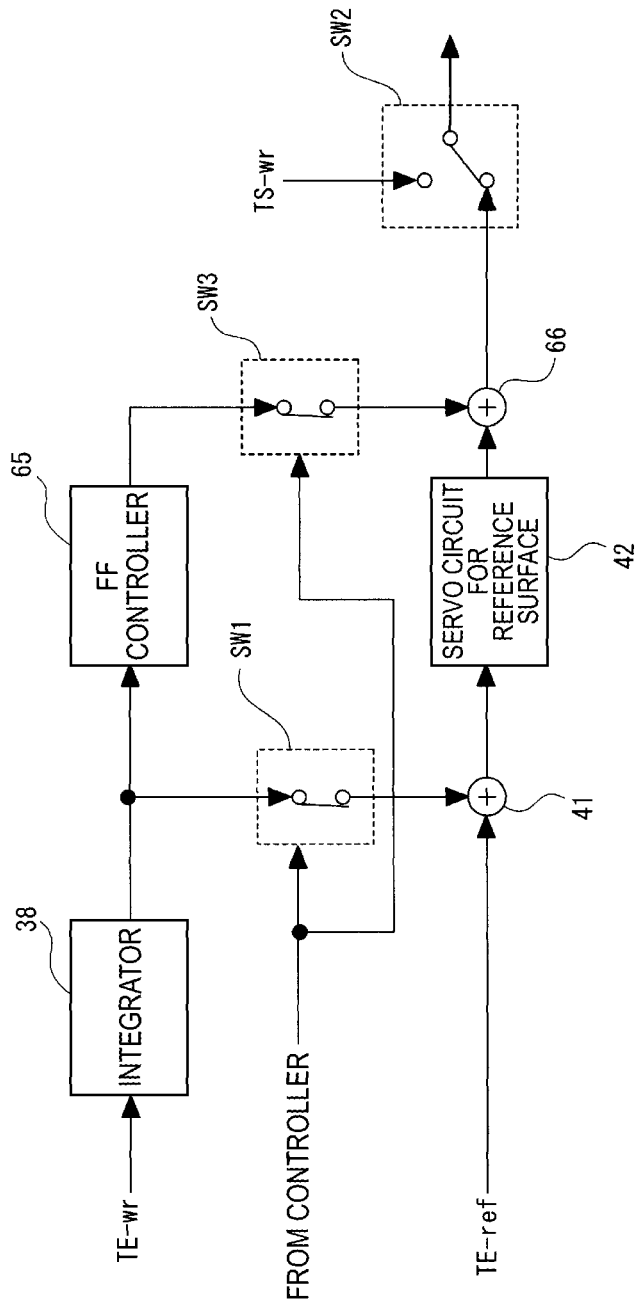
FIG. 22 is a diagram illustrating a configuration of an actual ATS+ control system to which the feedforward controller is added.

In FIG. 22, only a configuration of a signal processing system in the ATS+ control system is mainly extracted and illustrated. Because the configuration of the position control apparatus (recording/reproducing apparatus) according to this embodiment is the same as the configuration of the recording/reproducing apparatus 10 illustrated in FIGS. 8 and 9, except for only a configuration of portions illustrated in FIG. 22, illustration of a configuration of the other portions is omitted.

As illustrated in FIG. 22, in the ATS+ control system according to this embodiment, an FF controller 65, an adder 66, and a switch SW3 are added as compared with the configuration illustrated in FIG. 9.

The FF controller 65 corresponds to the FF controller 60 illustrated in FIG. 16 and the adder 66 corresponds to the adder 61.

As illustrated in FIG. 22, the adder 66 is provided to be inserted between the servo circuit 42 for the reference surface and the switch SW2.

The FF controller 65 executes a filter process to provide a signal characteristic based on the transfer function $K_f(z)$ with respect to the output signal from the integrator 38 and generates a control signal to be provided to the reference surface loop. As the FF controller 65, a digital filter such as a finite impulse response (FIR) filter can be used.

As understood from the above description, a filter coefficient to realize the transfer function $K_f(z)$ set to satisfy a condition where the gain of the ATS+ control system is not more than 0 dB is set to the FF controller 65.

The control signal that is generated by the FF controller 65 is supplied to the switch SW3. The switch SW3 is provided to realize switching of generation of the tracking servo signal TS-ref to be used at the time of reference surface seek and generation of the tracking servo signal TS-ats+ (in this case, the control signal is added) to realize the ATS+ executed at the time of recording, similar to the switch SW1. The same ON/OFF control as the switch SW1 is performed by the controller 46.

The switch SW3 is turned on, so that the control signal generated by the FF controller 65 is provided to the reference surface loop by the adder 66.

[5-2. Example of Specific Characteristic Derivation Method]

As understood from the above description, the characteristic (transfer function) set to the FF controller (60 and 65) becomes important when an operation of the ATS+ control system is securely stabilized.

The characteristic of the FF controller may be set to satisfy the condition where the gain of the ATS+ control system is not more than 0 dB, as described above, and the characteristic derivation method is not limited in particular.

However, it is not efficient to derive the transfer characteristic satisfying the condition after trial and error and the transfer characteristic satisfying the condition may not be securely derived.

Figure 23:
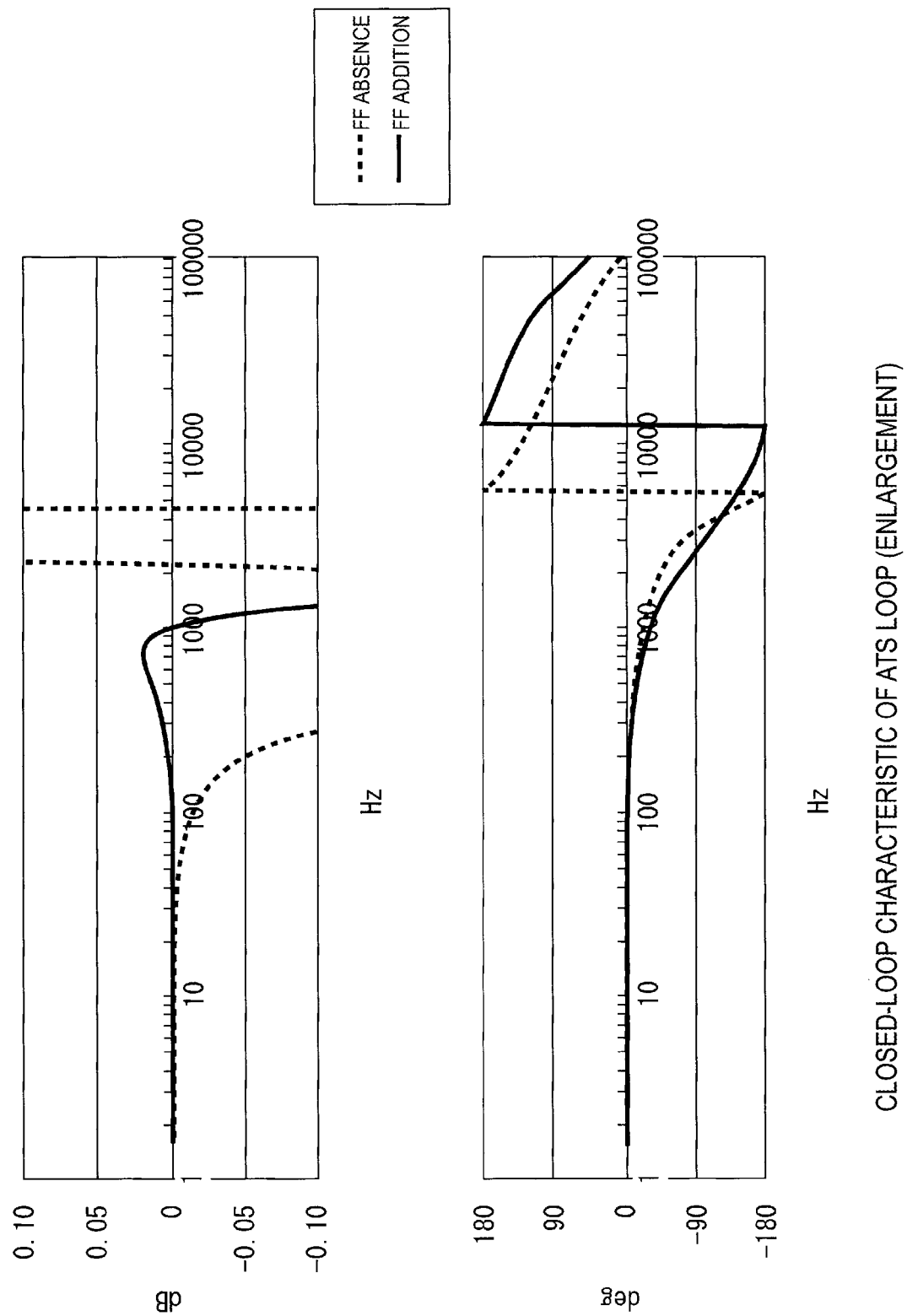
FIG. 23 is an enlarged view of a closed-loop characteristic of an ATS loop.

FIG. 23 is an enlarged view of the closed-loop characteristic of the ATS loop. Even though the characteristic where the gain is not more than 0 dB can be set, referring to the enlarged view, the gain may become slightly more than 0 dB in actuality. In this case, the stability is improved as compared with the "FF absence". However, the oscillation may be generated and the stability may not be sufficiently improved.

In consideration of this point, an efficient and secure derivation method with respect to the transfer function of the FF controller is suggested in this embodiment.

Specifically, as the derivation method, a method using a limited pole placement method (refer to URAKAWA Yoshiyuki: "Limited Pole Placement Method for Digital Control System with Calculation Delay", Institute of Electrical Engineers of Japan, IIC-12-092, 2012) is used. More specifically, the closed-loop characteristic of the ATS loop is designated by the pole-zero placement and the transfer function satisfying the condition is calculated.

Figure 24:
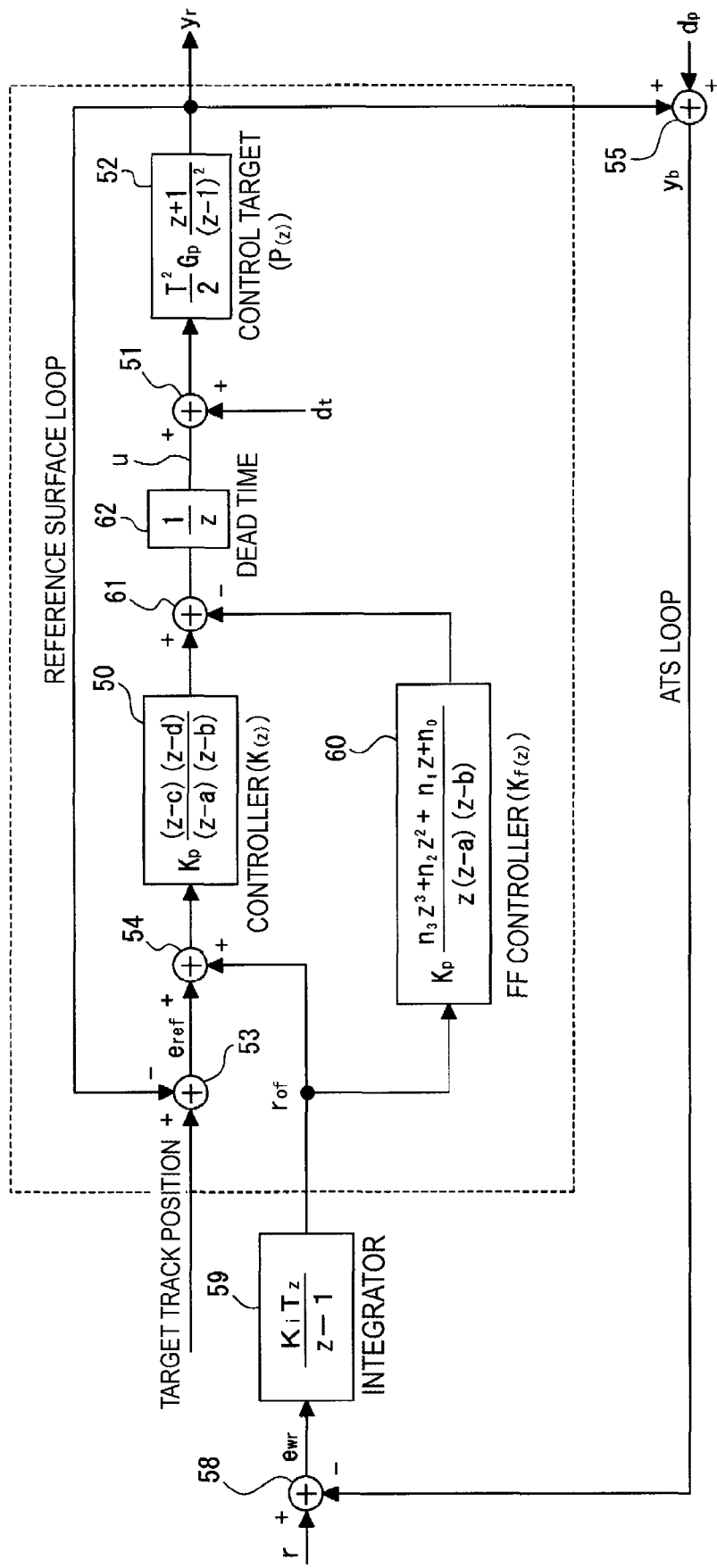
FIG. 24 is a conceptual diagram of the case in which an ATS+ control system according to this embodiment is redrafted in a form to clearly specify control parameters thereof.

FIG. 24 is a conceptual diagram of the case in which the ATS+ control system according to this embodiment described with reference to FIG. 16 is redrafted in a form to clearly specify control parameters thereof.

As illustrated in FIG. 24, the transfer function $K(z)$ of the controller 50 can be represented as $K_p\{(z-c)(z-d)\}/\{(z-a)(z-b)\}$.

In addition, the transfer function $K_f(z)$ of the FF controller 60 can be represented as $K_p(n_3z^3+n_2z^2+n_1z+n_0)/\{z(z-a)(z-b)\}$.

In addition, the transfer function $P(z)$ of the control target 52 can be represented as $(T^2/2)G_p(z+1)/(z-1)^2$.

In this case, a dead time 62 (the transfer function is set to $1/z$) is inserted between the adders 61 and 51. The dead time corresponds to a processing delay time. An output of the dead time 62 becomes "u".

From the above description, it should be noted that the transfer function of the FF controller 60 becomes a cubic transfer function.

Under the premise described above, it is necessary to satisfy a condition of the following expression 1, such that DC gain of the closed-loop characteristic (that is, the closed-loop characteristic from the offset $r_{of}$ to the position $y_r$) of the reference surface loop becomes "1".

$$n_3+n_2+n_1+n_0=0 \qquad \text{Expression 1}$$

Here, when the closed-loop characteristic (the transfer function from r to $y_r$) of the ATS loop is considered, in order that the possibility of the gain becoming more than 0 dB is lowered, a pole and a zero point are placed on a real axis.

However, even though the pole and the zero point are simply placed on the real axis, if an angular frequency of the zero point (root of a numerator expression) becomes lower than an angular frequency of the pole (root of a denominator expression), a high frequency emphasis characteristic of the zero point appears first at the side of a low frequency. For this reason, the gain of the closed-loop characteristic may become more than 0 dB.

In contrast, if the angular frequency of the zero point is equal to or higher than the angular frequency of the pole, because the high frequency emphasis characteristic of the zero point can be prevented from appearing first at the side of the low frequency, the gain of the closed-loop characteristic can be suppressed to 0 dB or less. For example, if the angular frequency of the zero point becomes higher than the angular frequency of the pole, an action by the pole (action to decrease the gain) can appear first at the side of the low frequency.

In view of this point, control parameters where the pole is at a position faster than the ATS+ control system corresponding to the "FF absence" and the angular frequency of the zero point becomes the angular frequency of the pole are calculated. Thereby, derivation of control parameters that satisfy the condition where the gain of the ATS+ control system is not more than 0 dB is enabled.

First, a calculation expression of the control parameters is calculated.

Figure 25:
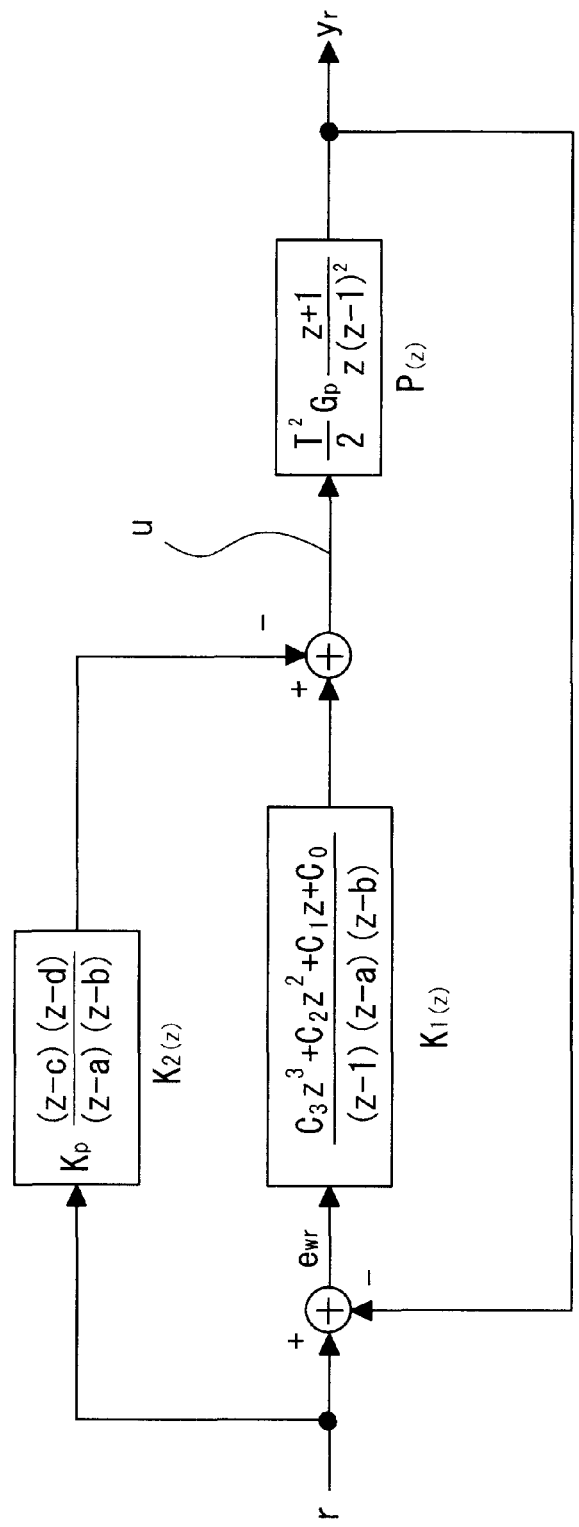
FIG. 25 is a diagram illustrating the case in which a configuration illustrated in FIG. 24 is redrafted to derive a calculation expression of control parameters.

The configuration illustrated in FIG. 24 can be redrafted as illustrated in FIG. 25. However, in FIG. 25, the following expressions are satisfied.

$$C_3 = K_p(TK_i(1-n_3)+1) \quad \text{Expression 2}$$

$$C_2 = -K_p(TK_i((c+d)+n_2)+(c+d+1)) \quad \text{Expression 3}$$

$$C_1 = K_p(TK_i(cd-n_1)+c+d+cd) \quad \text{Expression 4}$$

$$C_0 = -K_p(TK_i n_0 + cd) \quad \text{Expression 5}$$

At this time, the transfer function from r to $y_r$ is as represented by an expression 6.

$$G(z) = \frac{\frac{(C_3 z^3 + C_2 z^2 + C_1 z + C_0) - K_p(z-1)(z-c)(z-d)}{(z-1)(z-a)(z-b)} \cdot \frac{T^2}{2} G_p \frac{(z+1)}{z(z-1)^2}}{1 + \frac{C_3 z^3 + C_2 z^2 + C_1 z + C_0}{(z-1)(z-a)(z-b)} \cdot \frac{T^2}{2} G_p \frac{(z+1)}{z(z-1)^2}}$$

$$= \frac{((C_3 z^3 + C_2 z^2 + C_1 z + C_0) - K_p(z-1)(z-c)(z-d)) \frac{T^2}{2} G_p(z+1)}{z(z-1)^3(z-a)(z-b) + (C_3 z^3 + C_2 z^2 + C_1 z + C_0)\frac{T^2}{2} G_p(z+1)}$$

Expression 6

In the expression 6, because control parameters with respect to a 6th-order denominator expression are five including $C_0$, $C_1$, $C_2$, $C_3$, and b, five poles are displaced by applying the limited pole placement method and the remaining one pole is automatically determined (a in controllers $k_1(z)$ and $k_2(z)$ is a frequency to interrupt the integration and is determined separately from a factor such as a disc rotation frequency).

In addition, a numerator expression is a 4th-order expression, but it is decided to have a point zero in $z=-1$ because $(z+1)$ is bracketed. Because control parameters with respect to the remaining three zero points are three including c, d, and $K_p$, the zero points can be placed at any positions.

Finally, five control parameters of $n_0$, $n_1$, $n_2$, $n_3$, and $K_i$ can be calculated from the expressions 2 to 5 and the expression 1 regarding $C_p$, $C_1$, $C_2$, and $C_3$.

In this way, the controller parameters that satisfy the positions of the five poles and the three zero points can be calculated. The detail will be described below.

First, application of the limited pole placement method will be described.

Because the placement of the poles is considered, a portion regarding a feedback controller $K_1(z)$ of FIG. 25 is extracted and considered. At this time, the portion is divided into a "parameter portion" including the control parameters and a "fixed portion" not including the control parameters and is redrafted as illustrated in FIG. 26.

Figure 26:
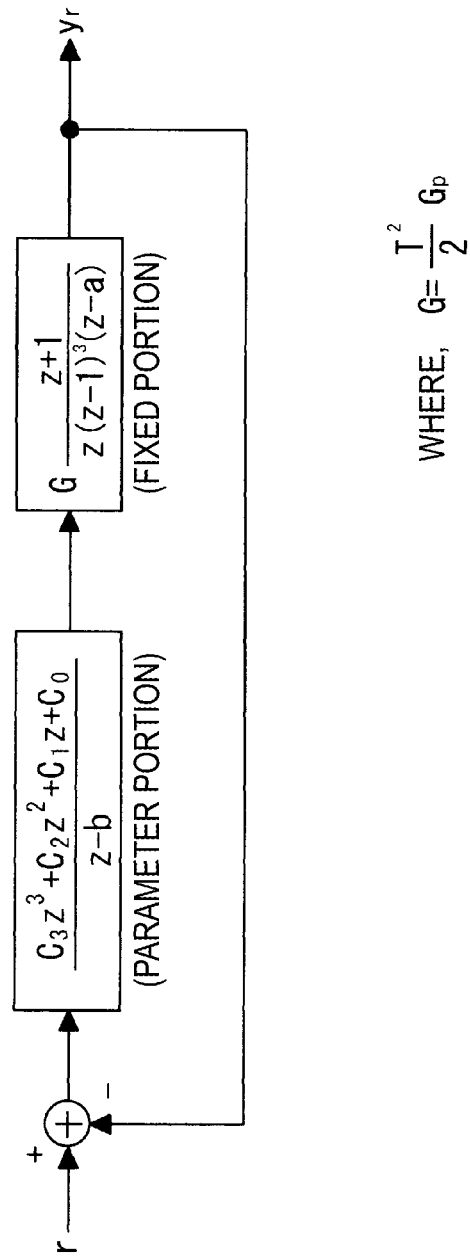
FIG. 26 is a diagram illustrating the case in which a portion regarding a feedback controller (K1(z)) of FIG. 25 is extracted and is divided into a "parameter portion" and a "fixed portion"

However, $G=(T^2/2)G_p$ is satisfied as illustrated in FIG. 26.

Here, if the parameter portion is set to $\beta(z)/\alpha(z)$ and the fixed portion is set to $n(z)/d(z)$, $\beta(z)/\alpha(z)$ and $n(z)/d(z)$ can be represented by expressions 7 and 8, respectively.

$$\frac{\beta(z)}{\alpha(z)} = \frac{\beta_3 z^3 + \beta_2 z^2 + \beta_1 z + \beta_0}{\alpha_1 z + \alpha_0} = \frac{C_3 z^3 + C_2 z^2 + C_1 z + C_0}{z - b} \quad \text{Expression 7}$$

-continued $$\frac{n(z)}{d(z)} = \frac{b_1 z + b_0}{z^5 + a_4 z^4 + a_3 z^3 + a_2 z^2 + a_1 z + a_0} \quad \text{Expression 8}$$

$$= G \frac{z+1}{z(z-1)^3(z-a)}$$

$$= \frac{Gz + G}{z^5 - (a+3)z^4 + (3a+3)z^3 - (3a+1)z^2 + az}$$

In addition, the closed-loop transfer function of FIG. 26 is represented by an expression 9.

$$\frac{\frac{\beta(z)}{\alpha(z)} \frac{n(z)}{d(z)}}{1 + \frac{\beta(z)}{\alpha(z)} \frac{n(z)}{d(z)}} = \frac{\beta(z)n(z)}{\alpha(z)d(z) + \beta(z)n(z)} = \frac{\beta(z)n(z)}{\gamma(z)} \quad \text{Expression 9}$$

If placement poles are set to $p_1$, $p_2$, $p_3$, $p_4$, and $p_5$ and a determination pole is set to q, a denominator expression $\gamma(z)$ of the expression 9 is represented by an expression 10.

$$\gamma(z) = (z-p_1)(z-p_2)(z-p_3)(z-p_4)(z-p_5)(z-q) \quad \text{Expression 10}$$

$$= (z^5 + P_4 z^4 + P_3 z^3 + P_2 z^2 + P_1 z + P_0)(z + Q_0)$$

Here, if the limited pole placement method is applied to the expressions 7 to 10, a control parameter $\theta^T = [\alpha_0, \alpha_1, \beta_0, \beta_1, \beta_2, \beta_3, \text{ and } Q_0]$ of the parameter portion can be calculated as represented by an expression 13, using matrix expressions represented by the following expressions 11 and 12.

$$\psi^T = [0 \quad P_0 \quad P_1 \quad P_2 \quad P_3 \quad P_4 \quad 1] \quad \text{Expression 11}$$

$$E = \begin{bmatrix} a_0 & a_1 & a_2 & a_3 & a_4 & 1 & 0 \\ 0 & a_0 & a_1 & a_2 & a_3 & a_4 & 1 \\ b_0 & b_1 & 0 & 0 & 0 & 0 & 0 \\ 0 & b_0 & b_1 & 0 & 0 & 0 & 0 \\ 0 & 0 & b_0 & b_1 & 0 & 0 & 0 \\ 0 & 0 & 0 & b_0 & b_1 & 0 & 0 \\ -P_0 & -P_1 & -P_2 & -P_3 & -P_4 & -1 & 0 \end{bmatrix} \quad \text{Expression 12}$$

$$\theta^T = \psi^T E^{-1} \quad \text{Expression 13}$$

The control parameters $C_0$, $C_1$, $C_2$, and $C_3$, and b and the determination pole q can be obtained from $\theta^T$ obtained by the expression 13, according to the following expressions 14 to 19.

$$C_0 = \beta_0 \quad \text{Expression 14}$$

$$C_1 = \beta_1 \quad \text{Expression 15}$$

$$C_2 = \beta_2 \quad \text{Expression 16}$$

$$C_3 = \beta_3 \quad \text{Expression 17}$$

$$b = -\alpha_0 \quad \text{Expression 18}$$

$$q = -Q_0 \quad \text{Expression 19}$$

Next, parameter calculation based on the zero point placement will be described.

If positions of three zero points to be placed are set to $p_{z1}$, $p_{z2}$, and $p_{z3}$, the following expression 20 is realized by considering the numerator expression of the expression 6 described above.

$$C_3z^3+C_2z^2+C_1z+C_0-(z-1)K_p(z-c)(z-d)=\delta_0(z-p_{z1})(z-p_{z2})(z-p_{z3}) \quad \text{Expression 20}$$

If a term including parameters is placed to a left side and a constant term is placed to a right side, the expression 20 becomes an expression 21.

$$(z-1)(\epsilon_2z^2+\epsilon_1z+\epsilon_0)+\delta_0(z^3+R_2z^2+R_1z+R_0)=C_3z^3+C_2z^2+C_1z+C_0 \quad \text{Expression 21}$$

The following expressions are satisfied.

$$\epsilon_2 = K_p \quad \text{Expression 22}$$

$$\epsilon_1 = -K_p(c+d) \quad \text{Expression 23}$$

$$\epsilon_0 = K_p cd \quad \text{Expression 24}$$

$$R_2 = -(p_{z1}+p_{z2}+p_{z3}) \quad \text{Expression 25}$$

$$R_1 = p_{z1}p_{z2}+p_{z2}p_{z3}+p_{z3}p_{z1} \quad \text{Expression 26}$$

$$R_0 = -p_{z1}p_{z2}p_{z3} \quad \text{Expression 27}$$

Here, if a coefficient of each term of the expression 21 is rewritten by a matrix expression, this can be represented by the following expression 28.

$$[\varepsilon_0 \; \varepsilon_1 \; \varepsilon_2 \; \delta_0] \begin{bmatrix} -1 & 1 & 0 & 0 \\ 0 & -1 & 1 & 0 \\ 0 & 0 & -1 & 1 \\ R_0 & R_1 & R_2 & 1 \end{bmatrix} = [C_0 \; C_1 \; C_2 \; C_3] \quad \text{Expression 28}$$

Thereby, $\epsilon_0$, $\epsilon_1$, $\epsilon_2$, and $\delta_0$ can be calculated as represented by the following expression 29.

$$[\varepsilon_0 \; \varepsilon_1 \; \varepsilon_2 \; \delta_0] = [C_0 \; C_1 \; C_2 \; C_3] \begin{bmatrix} -1 & 1 & 0 & 0 \\ 0 & -1 & 1 & 0 \\ 0 & 0 & -1 & 1 \\ R_0 & R_1 & R_2 & 1 \end{bmatrix}^{-1} \quad \text{Expression 29}$$

That is, $K_p$, c, and d can be calculated from the positions of the zero points, using the expressions 29 and the expressions 22 to 24.

Finally, $K_i$, $n_0$, $n_1$, $n_2$, and $n_3$ can be calculated from the calculated $C_0$, $C_1$, $C_2$, $C_3$, $K_p$, c, and d, using the following expressions 30 to 34 obtained by transforming the expressions 1 to 5.

$$K_i = \frac{C_0 + C_1 + C_2 + C_3}{K_p T(1 - (c+d) + cd)} \quad \text{Expression 30}$$

$$n_0 = \frac{-cd - \dfrac{C_0}{K_p}}{TK_i} \quad \text{Expression 31}$$

$$n_1 = \frac{TK_i cd + (c+d) + cd - \dfrac{C_1}{K_p}}{TK_i} \quad \text{Expression 32}$$

$$n_2 = \frac{-TK_i(c+d) - (c+d) - 1 - \dfrac{C_2}{K_p}}{TK_i} \quad \text{Expression 33}$$

$$n_3 = \frac{TK_i + 1 - \dfrac{C_3}{K_p}}{TK_i} \quad \text{Expression 34}$$

Hereinafter, collection of the methods of calculating the control parameters is described.

(i) First, polynomial expression coefficients $P_1$, $P_2$, $P_3$, and $P_4$ are calculated from the poles $p_1$, $p_2$, $p_3$, $p_4$, and $p_5$ to be placed, on the basis of the expression 10.

(ii) Matrixes $\Psi$ and E of the expressions 11 and 12 are generated from the calculated coefficients $P_1$, $P_2$, $P_3$, and $P_4$ and coefficients $a_0$, $a_1$, $a_2$, $a_3$, $a_4$, $b_0$, and $b_1$ of the fixed portion (expression 8) obtained from a control target model and $\theta^T$ is calculated from the expression 13.

(iii) $C_0$, $C_1$, $C_2$, $C_3$, and b are calculated from a value of each element of the obtained $\theta^T$ and the expressions 14 to 18. Thereby, parameters associated with the poles are obtained.

(iv) $R_0$, $R_1$, and $R_2$ are calculated from zero points $p_{z1}$, $p_{z2}$, and $p_{z3}$ to be subsequently designated and the expression 25 to 27.

(v) The calculated $R_0$, $R_1$, and $R_2$ and $C_0$, $C_1$, $C_2$, and $C_3$ calculated by the pole placement are substituted and $\epsilon_0$, $\epsilon_1$, $\epsilon_2$, and $\delta_0$ are calculated from the expression 28. $K_p$, c+d, and cd can be calculated from the calculated $\epsilon_0$, $\epsilon_1$, and $\epsilon_2$ using the expressions 22 to 24 and $K_i$, $n_0$, $n_1$, $n_2$, and $n_3$ can be calculated from $C_0$, $C_1$, $C_2$, and $C_3$ and the expressions 30 to 34.

By the above configuration, the control parameters $K_p$, c+d, cd, and b of the controller 50 (K(z)), the control parameters $n_0$, $n_1$, $n_2$, and $n_3$ of the FF controller 60 (Kf(z)), and the gain $K_i$ of the integrator 59 can be obtained.

By using the control parameter calculation method described above, derivation of the transfer function of the control system that satisfies the condition where the gain of the ATS+ control system is not more than 0 dB can be securely and efficiently performed.

Hereinafter, a specific parameter setting example using the parameter calculation method will be described.

First, in this example, as the premise, the transfer function of the control target 52 (P(z)) is represented by the following expression 35.

$$P(z) = \frac{3.08352 \times 10^{-7}(z+1)}{z^2 - 1.99952826z + 0.99952887} \quad \text{Expression 35}$$

Figure 27:
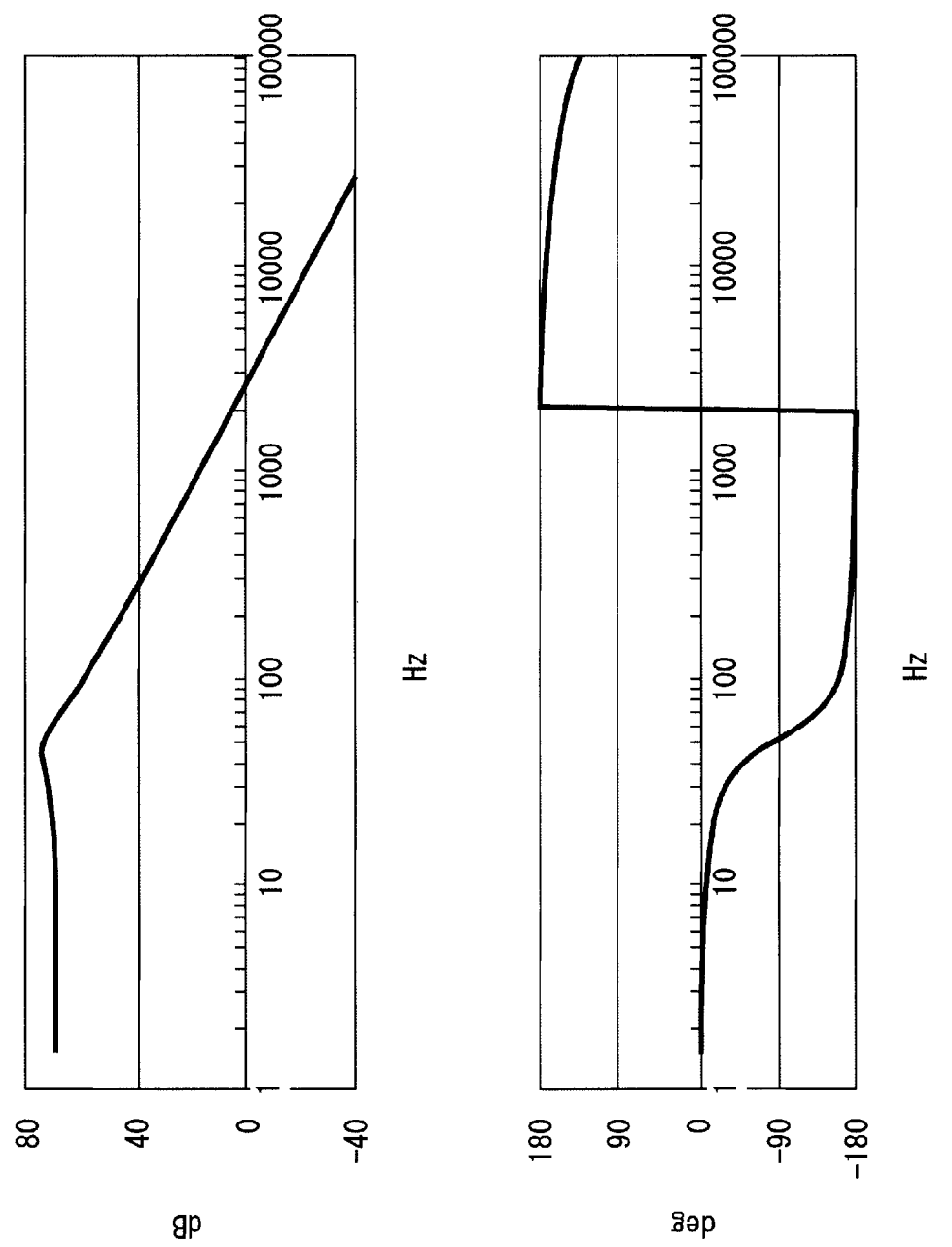
FIG. 27 is a diagram illustrating a frequency characteristic of a control target (P(z)) premised in a specific parameter setting example.

At this time, a frequency characteristic of the control target 52 is as illustrated in FIG. 27.

In the control system in which the frequency characteristic is exemplified as the "FF absence", the control target P(z) is provided by the expression 35, a sampling frequency is set to 400 kHz, $n_0=n_1=n_2=n_3=0$ (that is, FF control absence) is set, and Ki=2000, Kp=2.0, a=0.99937, b=0.82829, c=0.99344, and d=0.98353 are set.

At this time, the closed-loop poles become $(-344\pm36.7j)\times 2\pi$(rad/s), $-2676\times2\pi$(rad/s), and $(-3678\pm2896j)\times2\pi$(rad/s)). If only $K_i$ is sextupled to increase the gain of the ATS loop by the control parameters, the phase margin and the gain margin in the open-loop characteristic decrease as illustrated in FIG. 14, the frequency region where the gain becomes more than 0 dB is generated in the closed-loop characteristic as illustrated in FIG. 15, and an emission is caused in the ATS+ control system.

Meanwhile, if the slow pole $(-344\pm36.7j)\times2\pi$(rad/s) in the example of the "FF absence" is moved to $-2676\times2\pi$(rad/s), using the control parameter calculation method, it is anticipated that control performance is improved. Therefore, in this example, control parameters in the case in which three poles are placed in $-2676\times2\pi$(rad/s) and one pole is placed in $(-3678\pm2896j)\times2\pi$(rad/s) and three zero points are placed in $-2676\times2\pi$(rad/s), similar to the poles, not to become slower than the slowest pole, are calculated.

In this case, $K_i=17495$, $K_p=3.4697$, $b=0.7477$, $c=0.983+0.0112j$, $d=0.983-0.0112j$, $n_3=-4.9402$, $n_2=15.1211$, $n_1=-15.4173$, and $n_0=5.2365$ are satisfied.

Figure 28:
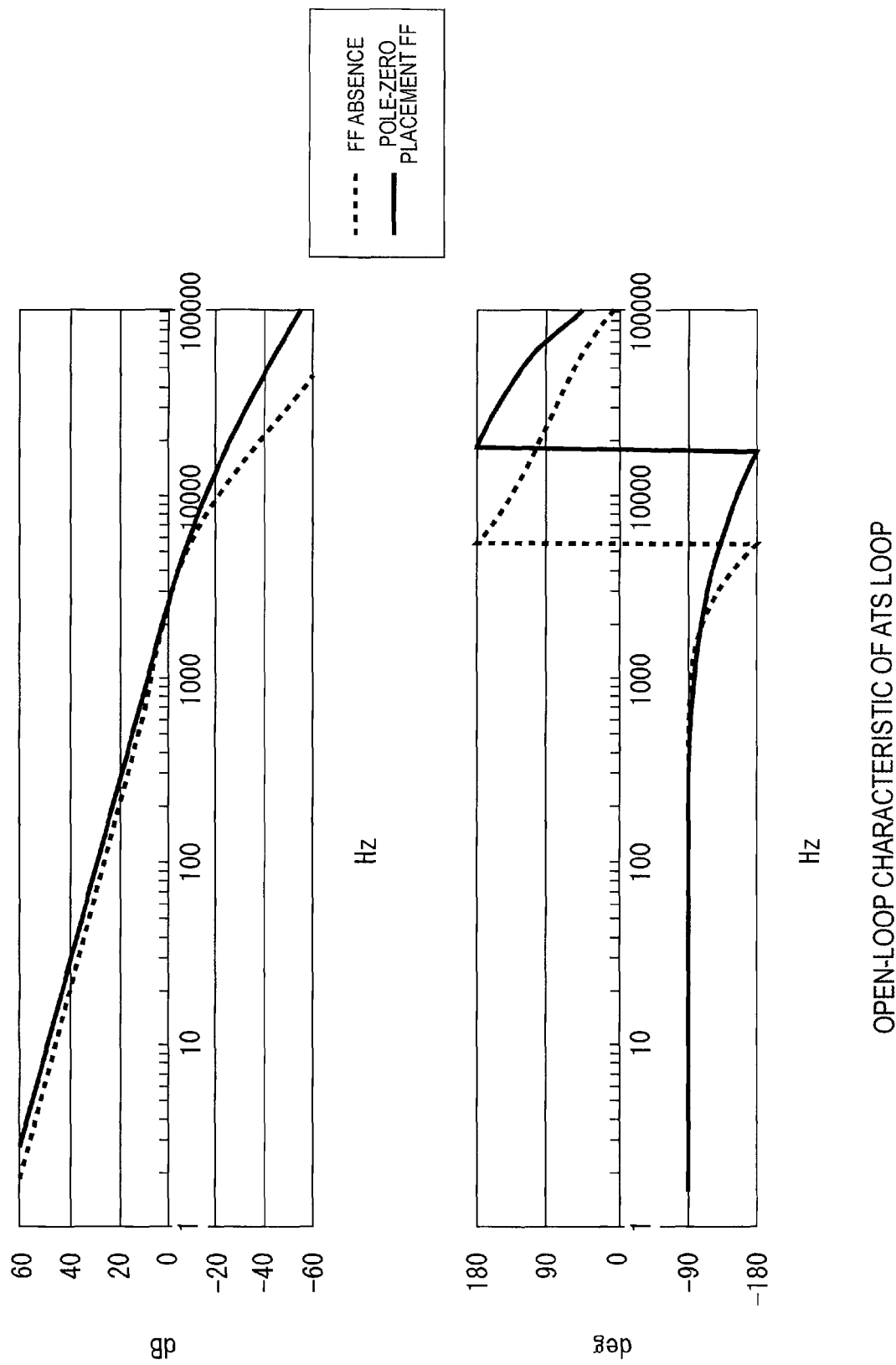
FIG. 28 is a diagram illustrating an open-loop characteristic of an ATS loop when parameter setting of this example is performed.
Figure 29:
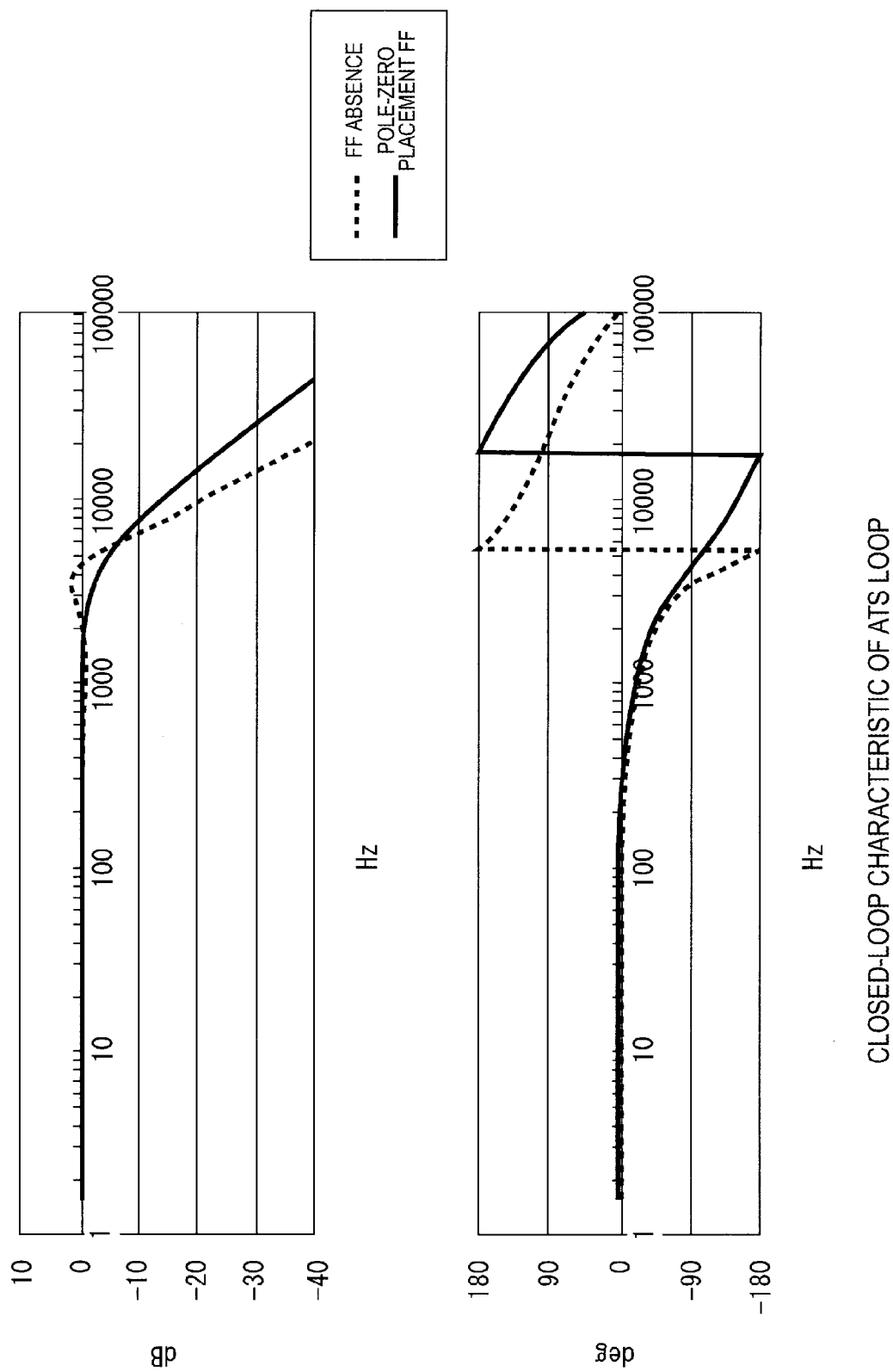
FIG. 29 is a diagram illustrating a closed-loop characteristic of an ATS loop when parameter setting of this example is performed.

The open-loop characteristic and the closed-loop characteristic of the ATS loop at that time are illustrated in FIGS. 28 and 29, respectively. In FIGS. 28 and 29, a characteristic when the parameter setting of this example is performed is illustrated as a "pole-zero placement FF" by a solid line. In FIGS. 28 and 29, a characteristic of "FF absence" is illustrated by a broken line.

Referring to FIG. 28, it can be confirmed that a phase is moderated and the phase margin increases as compared with the "FF absence". For this reason, in the closed-loop characteristic illustrated in FIG. 29, a peak is not generated and the gain becomes 0 dB or less.

Figure 30:
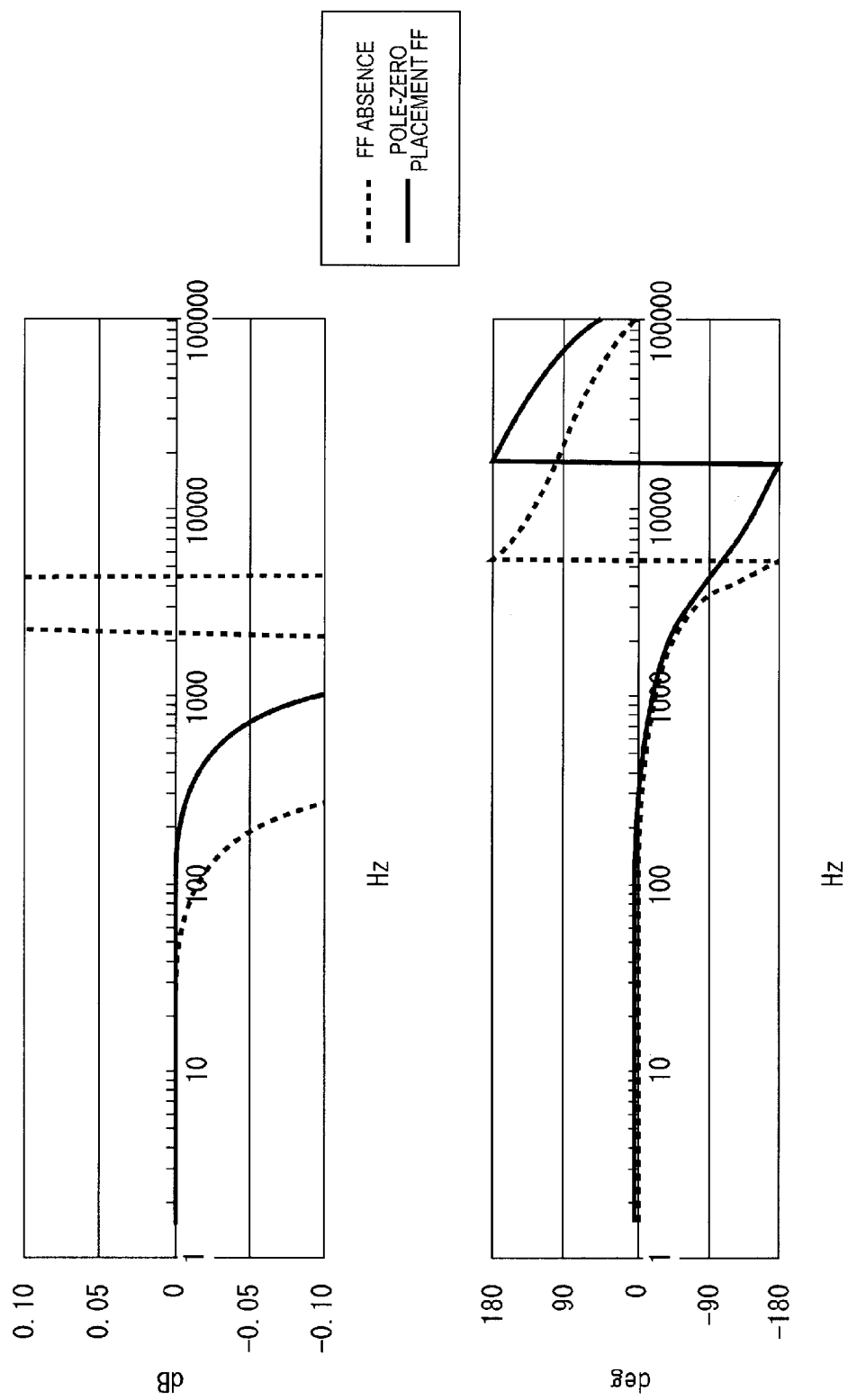
FIG. 30 is an enlarged view of a frequency characteristic illustrated in FIG. 29.

An enlarged view of the frequency characteristic illustrated in FIG. 29 is illustrated in FIG. 30.

Referring to FIG. 30, it can be confirmed that there is no region where the gain is slightly more than 0 dB, according to the parameter setting of this example.

According to this parameter setting example, the gain of the ATS+ control system is securely suppressed to 0 dB or less.

According to the parameter setting example, the ATS+ control system that is stably operated even though the gain of the ATS loop is sextupled can be realized. In other words, a recording operation in which an influence of the spot deviation is suppressed to ⅙ as compared with the ATS+ control system of the "FF absence" can be realized. That is, the track pitch can be narrowed and the recording density can be improved.

<6. Modification>

The embodiment of the present disclosure has been described. However, the present disclosure is not limited to the specific examples described above.

For example, the derivation method of the transfer function based on the pole-zero placement method described above is only exemplary and the derivation method of the transfer function that satisfies the condition where the gain of the ATS+ control system is not more than 0 dB is not limited thereto.

As understood from the above description, the present disclosure is to perform the feedforward control to provide the control signal based on the integration output by the integrator 59 with respect to the reference surface loop. Thereby, the gain of the ATS+ control system can be prevented from becoming more than 0 dB and the stable ATS+ control system in which the oscillation is prevented can be realized.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A position control apparatus including:

a light radiating/receiving unit that performs radiation of laser light for recording and laser light for adjacent track servo targeted at a recording layer and radiation of laser light for a reference surface targeted at the reference surface, onto an optical disc recording medium including the reference surface to which a position guider is provided and the recording layer where information recording is performed, through a common objective lens, and receives return light of the laser light for the adjacent track servo and the laser light for the reference surface;

a tracking mechanism unit that displaces the objective lens in a tracking direction;

a reference surface tracking error signal generating unit that generates a reference surface tracking error signal showing tracking error of a radiation spot of the laser light for the reference surface with respect to the position guider, on the basis of a light reception signal with respect to the return light of the laser light for the reference surface obtained by the light radiating/receiving unit;

a reference surface tracking servo control unit that controls the tracking mechanism unit, on the basis of a tracking servo signal generated on the basis of the reference surface tracking error signal;

a recording layer tracking error signal generating unit that generates a recording layer tracking error signal showing tracking error of a radiation spot of the laser light for the adjacent track servo with respect to a recording track, on the basis of a light reception signal with respect to the return light of the laser light for the adjacent track servo obtained by the light radiating/receiving unit;

an integrating unit that integrates the recording layer tracking error signal;

an offset providing unit that provides an integration output by the integrating unit as an offset with respect to a control target value by the tracking servo control unit; and a feedforward control unit that generates a control signal based on the integration output by the integrating unit and provides the control signal with respect to the tracking servo signal by the reference surface tracking servo control unit.

(2) The position control apparatus according to (1), wherein the feedforward control unit generates the control signal by a control characteristic set in a manner that gain of an entire control loop including the reference surface tracking servo control unit, the tracking mechanism unit, the recording layer tracking error signal generating unit, the integrating unit, and the offset providing unit does not exceed 0 dB.

(3) The position control apparatus according to (2), wherein the control characteristic of the feedforward control unit is set on the basis of a cubic transfer function.

(4) The position control apparatus according to (2) or (3), wherein the control characteristic of the feedforward control unit is set in a manner that an angular frequency of a zero point of a frequency characteristic of a closed loop functioning as the entire control loop becomes equal to or more than an angular frequency of a pole.

What is claimed is:

1. A position control apparatus comprising:
   a light radiating/receiving unit that performs radiation of laser light for recording and laser light for adjacent track servo targeted at a recording layer and radiation of laser light for a reference surface targeted at the reference surface, onto an optical disc recording medium including the reference surface to which a position guider is provided and the recording layer where information recording is performed, through a common objective lens, and receives return light of the laser light for the adjacent track servo and the laser light for the reference surface;

a tracking mechanism unit that displaces the objective lens in a tracking direction;

a reference surface tracking error signal generating unit that generates a reference surface tracking error signal showing tracking error of a radiation spot of the laser light for the reference surface with respect to the position guider, on the basis of a light reception signal with respect to the return light of the laser light for the reference surface obtained by the light radiating/receiving unit;

a reference surface tracking servo control unit that controls the tracking mechanism unit, on the basis of a tracking servo signal generated on the basis of the reference surface tracking error signal;

a recording layer tracking error signal generating unit that generates a recording layer tracking error signal showing tracking error of a radiation spot of the laser light for the adjacent track servo with respect to a recording track, on the basis of a light reception signal with respect to the return light of the laser light for the adjacent track servo obtained by the light radiating/receiving unit;

an integrating unit that integrates the recording layer tracking error signal;

an offset providing unit that provides an integration output by the integrating unit as an offset with respect to a control target value by the tracking servo control unit; and a feedforward control unit that generates a control signal based on the integration output by the integrating unit and provides the control signal with respect to the tracking servo signal by the reference surface tracking servo control unit.

2. The position control apparatus according to claim 1, wherein the feedforward control unit generates the control signal by a control characteristic set in a manner that gain of an entire control loop including the reference surface tracking servo control unit, the tracking mechanism unit, the recording layer tracking error signal generating unit, the integrating unit, and the offset providing unit does not exceed 0 dB.

3. The position control apparatus according to claim 2, wherein the control characteristic of the feedforward control unit is set on the basis of a cubic transfer function.

4. The position control apparatus according to claim 2, wherein the control characteristic of the feedforward control unit is set in a manner that an angular frequency of a zero point of a frequency characteristic of a closed loop functioning as the entire control loop becomes equal to or more than an angular frequency of a pole.

5. A position control method of a position control apparatus including a light radiating/receiving unit that performs radiation of laser light for recording and laser light for adjacent track servo targeted at a recording layer and radiation of laser light for a reference surface targeted at the reference surface, onto an optical disc recording medium including the reference surface to which a position guider is provided and the recording layer where information recording is performed, through a common objective lens, and receives return light of the laser light for the adjacent track servo and the laser light for the reference surface, a tracking mechanism unit that displaces the objective lens in a tracking direction, a reference surface tracking error signal generating unit that generates a reference surface tracking error signal showing tracking error of a radiation spot of the laser light for the reference surface with respect to the position guider, on the basis of a light reception signal with respect to the return light of the laser light for the reference surface obtained by the light radiating/receiving unit, a reference surface tracking servo control unit that controls the tracking mechanism unit, on the basis of a tracking servo signal generated on the basis of the reference surface tracking error signal, a recording layer tracking error signal generating unit that generates a recording layer tracking error signal showing tracking error of a radiation spot of the laser light for the adjacent track servo with respect to a recording track, on the basis of a light reception signal with respect to the return light of the laser light for the adjacent track servo obtained by the light radiating/receiving unit, an integrating unit that integrates the recording layer tracking error signal, and an offset providing unit that provides an integration output by the integrating unit as an offset with respect to a control target value by the tracking servo control unit, the position control method comprising:

performing feedforward control to generate a control signal based on the integration output by the integrating unit and provide the control signal with respect to the tracking servo signal by the reference surface tracking servo control unit.

\* \* \* \* \*